United States Patent
Urano et al.

(10) Patent No.: US 12,222,715 B2
(45) Date of Patent: Feb. 11, 2025

(54) REMOTE SERVER, METHOD, AND STORAGE MEDIUM FOR ENABLING EFFICIENT PROCESSING OF A PLURALITY OF REQUESTS FOR REMOTE VEHICULAR SUPPORT

(71) Applicant: TOYOTA JIDOSHA KABUSHIKI KAISHA, Toyota (JP)

(72) Inventors: Hiromitsu Urano, Numazu (JP); Hiromitsu Kobayashi, Nisshin (JP); Sho Otaki, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

(21) Appl. No.: 17/949,397

(22) Filed: Sep. 21, 2022

(65) Prior Publication Data
US 2023/0106666 A1    Apr. 6, 2023

(30) Foreign Application Priority Data
Oct. 4, 2021    (JP) .................................. 2021-163214

(51) Int. Cl.
*G05D 1/00*    (2024.01)
*G06V 10/56*    (2022.01)
*G06V 20/58*    (2022.01)

(52) U.S. Cl.
CPC ......... *G05D 1/0027* (2013.01); *G05D 1/0038* (2013.01); *G05D 1/0274* (2013.01); *G06V 10/56* (2022.01); *G06V 20/584* (2022.01)

(58) Field of Classification Search
None
See application file for complete search history.

(56) References Cited

U.S. PATENT DOCUMENTS

| | | | |
|---|---|---|---|
| 2019/0294159 A1* | 9/2019 | Pedersen | G08G 1/207 |
| 2020/0062267 A1* | 2/2020 | Magzimof | B60W 50/082 |
| 2022/0217237 A1* | 7/2022 | Sasaki | H04M 3/5238 |

FOREIGN PATENT DOCUMENTS

JP    2018-077649 A    5/2018

OTHER PUBLICATIONS

U.S. Appl. No. 17/893,837, filed Aug. 23, 2022; Inventor: Akihide Tachibana.

* cited by examiner

*Primary Examiner* — Brian P Sweeney
*Assistant Examiner* — Jonathan E Reinert
(74) *Attorney, Agent, or Firm* — Dinsmore & Shohl LLP

(57) ABSTRACT

A processor performs a mediation process of mediating remote support of at least one vehicle when receiving a request for remote support from the at least one vehicle. In the mediation process, at least two vehicles are organized into at least one group based on map information and position and traveling direction information of the at least two vehicles when requests for remote support from the at least two vehicles have been received in the same time period. The support order of the vehicles in the at least one group is determined for each group based on the map information and the position and traveling direction information of the at least two vehicles. The surrounding image information of the corresponding vehicle is transmitted to at least one support device that performs remote support of the vehicles organized into the at least one group in the support order.

7 Claims, 15 Drawing Sheets

REMOTE SERVER, METHOD, AND STORAGE MEDIUM FOR ENABLING EFFICIENT PROCESSING OF A PLURALITY OF REQUESTS FOR REMOTE VEHICULAR SUPPORT

CROSS-REFERENCE TO RELATED APPLICATION

This application claims priority to Japanese Patent Application No. 2021-163214 filed on Oct. 4, 2021, incorporated herein by reference in its entirety.

BACKGROUND

1. Technical Field

The disclosure relates to a remote support server, a remote support method, and a storage medium for remotely supporting a vehicle which can travel autonomously.

2. Description of Related Art

Japanese Unexamined Patent Application Publication No. 2018-77649 (JP 2018-77649 A) discloses a system that remotely controls a vehicle. This system according to the related art selects an operator that performs remote control of a vehicle when a request for remote control is received from the vehicle. Selection of an operator is performed by selecting an operator that satisfies predetermined conditions out of a plurality of operator candidates. The predetermined conditions include a condition that the corresponding operator is an operator having appropriately performed the latest remote control and a condition that the corresponding operator is an operator whose level of skill and level of alertness are equal to or greater than a reference value.

SUMMARY

In the system according to the related art, a vehicle requesting remote control includes an automated driving device. That is, a vehicle which is to be remotely controlled in the system according to the related art is a vehicle that can travel autonomously at a predetermined level. Then, it is predicted that details of a remote support request issued when a vehicle system including an automated driving device and a recognition device is normal are not "remote driving" in which manual driving by an operator is assumed, but "remote support" such as recognition support and determination support which are performed by an operator.

In such remote support, for example, a case in which sunlight hits a traffic signal in front of a vehicle that can travel autonomously is conceived. In this case, recognition accuracy of a lighting state of a light emitting unit of the traffic signal in a vehicle system decreases. When the vehicle system cannot recognize the lighting state, it is difficult to determine what behavior is to be performed at a certain timing. In this case, a request for remote support is issued. In response to this request, support of recognition of a lighting state and/or support of determination of behavior of the vehicle (for example, start) based on the lighting state recognized by an operator is performed.

Here, a period of time in which one operator is responsible for processing a request for remote support from one vehicle is predicted to be shorter than that for processing a request for remote driving from one vehicle. However, when a plurality of requests for remote support is issued in the same time period, these requests need to be processed by operators waiting for a request. In this regard, in the system according to the related art, efficient processing of a plurality of requests for remote support is not considered and thus there is room for improvement.

The disclosure provides a technique for enabling efficient processing of a plurality of requests for remote support when the requests are issued in the same time period.

According to a first aspect of the disclosure, there is provided a remote support server that performs remote support of a plurality of vehicles that is able to travel autonomously, the remote support server having the following features.

The remote support server includes: an information processing device including a memory configured to store various types of information and a processor configured to process the various types of information; and a communication device configured to communicate with the plurality of vehicles. The processor is configured to perform a mediation process of mediating remote support of at least one vehicle out of the plurality of vehicles when a request for remote support from the at least one vehicle has been received. The various types of information include map information, position and traveling direction information of the at least one vehicle, and surrounding image information of the at least one vehicle. The processor is configured to perform the mediation process including:

organizing at least two vehicles out of the plurality of vehicles into at least one group based on the map information and position and traveling direction information of the at least two vehicles when requests for remote support from the at least two vehicles have been received in the same time period; determining the support order of the vehicles in the at least one group for each group based on the map information and the position and traveling direction information of the at least two vehicles; transmitting the surrounding image information of the corresponding vehicle to at least one support device that performs remote support of the vehicles organized into the at least one group in the support order; and transmitting support instruction information generated in the support order to a vehicle which is a destination of the support instruction information when the support instruction information has been received from the at least one support device.

A second aspect of the disclosure is the first aspect further having the following feature.

The processor may be configured to perform the mediation process further including determining the support order sequentially from the head of the vehicles organized into the at least one group when traveling directions of all the vehicles organized into the at least one group are the same and all the vehicles are located in the same lane.

A third aspect of the disclosure is the first aspect further having the following feature.

The processor may be configured to perform the mediation process further including determining the support order sequentially from the vehicle from which the request for remote support has been received earliest when traveling directions of all the vehicles organized into the at least one group are the same and all the vehicles are not located in the same lane.

A fourth aspect of the disclosure is the first aspect further having the following features.

The various types of information may further include scheduled operation information indicating information of operations which are scheduled to be performed by the at least two vehicles. The processor may be configured to perform the mediation process further including determining the support order based on a combination of a receiving time of the request for remote support and the scheduled operation information when traveling directions of all the vehicles organized into the at least one group are not the same.

A fifth aspect of the disclosure is one of the first to fourth aspects further having the following features.

The various types of information may further include at least one of support cancellation information for canceling the request for remote support, lighting color information of a light emitting unit of a traffic signal which is provided in a traffic regulation spot in front of the at least one vehicle, and external recognition information of the at least one vehicle. The processor may be configured to perform the mediation process further including: reorganizing the at least one group using at least one of the support cancellation information, the lighting color information, and the external recognition information after the at least two vehicles have been organized into the at least one group and before the surrounding image information has been transmitted to the at least one support device.

According to a sixth aspect of the disclosure, there is provided a remote support method of performing remote support of a plurality of vehicles that is able to travel autonomously, the remote support method having the following features.

The remote support method includes: a step of receiving a request for remote support from at least one vehicle out of the plurality of vehicles; a step of organizing at least two vehicles out of the plurality of vehicles into at least one group based on map information and position and traveling direction information of the at least two vehicles when requests for remote support from the at least two vehicles have been received in the same time period; a step of determining the support order of the vehicles in the at least one group for each group based on the map information and the position and traveling direction information of the at least two vehicles; a step of transmitting surrounding image information of the corresponding vehicle to at least one support device that performs remote support of the vehicles organized into the at least one group in the support order; and a step of transmitting support instruction information generated in the support order to a vehicle which is a destination of the support instruction information when the support instruction information has been received from the at least one support device.

According to a seventh aspect of the disclosure, there is provided storage medium storing a remote support program causing a server to perform remote support of a plurality of vehicles that is able to travel autonomously.

The remote support program causes the server to perform: a process of receiving a request for remote support from at least one vehicle out of the plurality of vehicles; a process of organizing at least two vehicles out of the plurality of vehicles into at least one group based on map information and position and traveling direction information of the at least two vehicles when requests for remote support from the at least two vehicles have been received in the same time period; a process of determining the support order of the vehicles in the at least one group for each group based on the map information and the position and traveling direction information of the at least two vehicles; a process of transmitting surrounding image information of the corresponding vehicle to at least one support device that performs remote support of the vehicles organized into the at least one group in the support order; and a process of transmitting support instruction information generated in the support order to a vehicle which is a destination of the support instruction information when the support instruction information has been received from the at least one support device.

According to the first, sixth, and seventh aspects, when requests for remote support from at least two vehicles which stop temporarily at close positions have been issued in the same time period, these vehicles are organized into at least one group, and the support order in the same group is determined. Then, surrounding image information of the vehicles is transmitted to the support device that performs remote support of the vehicles organized into the same group. When support instruction information generated in the support order has been received from the support device, the support instruction information is transmitted to the vehicle which is a destination of the support instruction information. Accordingly, it is possible to efficiently process the requests for remote support from the vehicles organized into the same group. This results in a decrease in a burden on operators who process such requests.

According to the second aspect, when the traveling directions of all the vehicles organized into the same group are the same and all the vehicles are located in the same lane, it is possible to determine the support order sequentially from the head of the vehicles organized into the same group.

According to the third aspect, when the traveling directions of all the vehicles organized into the same group are the same and all the vehicles are not located in the same lane, it is possible to determine the support order sequentially from the vehicle from which the request for remote support has been received earliest.

According to the fourth aspect, when the traveling directions of all the vehicles organized into the same group are not the same, it is possible to determine the support order based on a combination of a receiving time of the request for remote support from all the vehicles and the scheduled operation information from all the vehicles.

According to the fifth aspect, after at least one group has been formed, it is possible to reorganize the group using at least one of the support cancellation information, the lighting color information, and the external recognition information. Accordingly, it is possible to prevent occurrence of a problem due to organization into groups by restricting the total number of vehicles organized into one group to an appropriate range.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
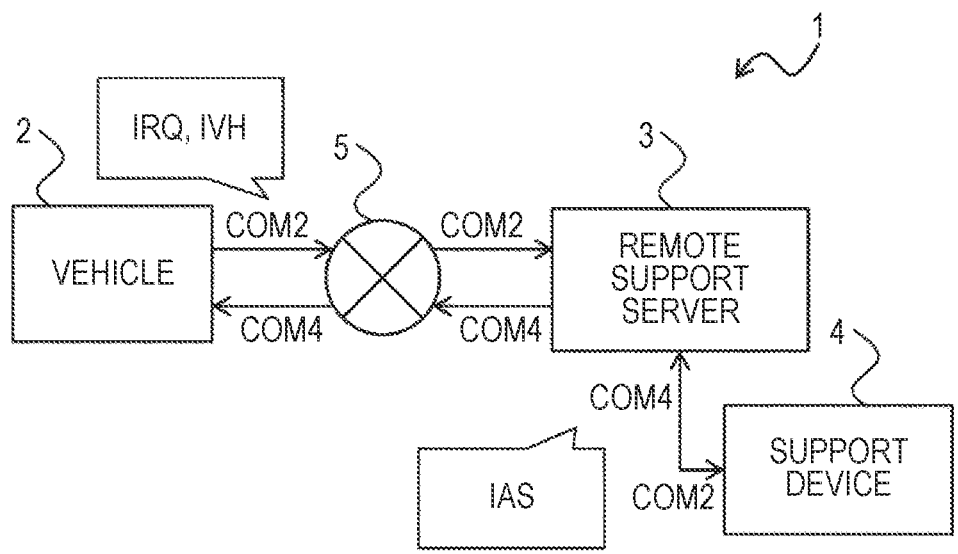
FIG. 1 is a diagram illustrating a remote support service.

Hereinafter, a remote support server, a remote support method, and a remote support program according to an embodiment of the disclosure will be described with reference to the accompanying drawings. In the drawings, the same or corresponding elements are referred to by the same reference signs, and description thereof is simplified or omitted.

1. Outline of Embodiment

1-1. Remote Support

Figure 2:
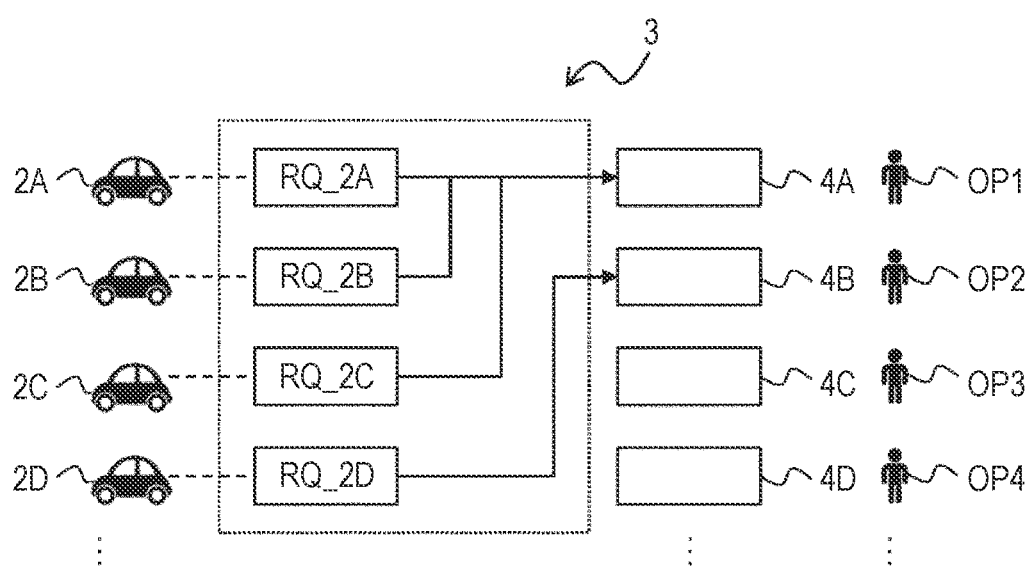
FIG. 2 is a diagram illustrating a remote support service.

A remote support server according to this embodiment constitutes a part of a system that provides a remote support service. FIGS. 1 and 2 are diagrams illustrating the remote support service. A system 1 illustrated in FIG. 1 includes a plurality of vehicles 2, a remote support server 3, and a plurality of support devices 4 as elements associated with the remote support service. The plurality of vehicles 2 and the remote support server 3 communicate with each other via a network 5. The remote support server 3 and the plurality of support devices 4 communicate with each other via a dedicated network. Here, this communication may be performed via the network 5.

Vehicles 2A to 2D which are the plurality of vehicles 2 and support devices 4A to 4D which are the plurality of support devices 4 are illustrated in FIG. 2. The support devices 4A to 4D are assigned to operators OP1 to OP4. The remote support server 3 determines a support device 4 (an operator OP) that performs support in response to requests for remote support (hereinafter also referred to as "support requests") RQ_2A to RQ_2D from the vehicles 2A to 2D out of the support devices 4A to 4D. In the example illustrated in FIG. 2, the support device 4A (operator OP1) is determined to perform support in response to the support requests RQ_2A to RQ_2C, and the support device 4B (operator OP2) is determined to perform support in response to the support request RQ_2D.

Referring back to FIG. 1, in communication between the plurality of vehicles 2 and the remote support server 3, communication information COM2 is transmitted from the plurality of vehicles 2 to the remote support server 3. The communication information COM2 is also transmitted from the remote support server 3 to the support device 4 to perform support in response to the request for support.

Communication information COM4 is transmitted from the remote support server 3 to the vehicles 2. The communication information COM4 has been transmitted as a response to the communication information COM2 from the support device 4 to the remote support server 3.

The plurality of vehicles 2 is configured to travel autonomously. Autonomous traveling is performed, for example, by an automated driving system mounted in each vehicle. The automated driving system performs automated driving control for controlling steering, acceleration, and deceleration of the corresponding vehicle 2. Examples of automated driving control include lane keeping control, preceding vehicle following control, and collision avoidance control. The lane keeping control is control for causing the corresponding vehicle 2 to travel in a lane in which the vehicle 2 is traveling. The preceding vehicle following control is control for causing the corresponding vehicle 2 to follow a preceding vehicle that is traveling in front of the vehicle 2. The collision avoidance control is control for avoiding collision of the corresponding vehicle 2 with an obstacle in front of the vehicle 2.

The plurality of vehicles 2 may have a configuration in which manual driving can be performed by a driver in the corresponding vehicle. When manual driving is possible, switching from automated driving to manual driving is performed while automated driving control is being performed. Alternatively, automated driving control is started while manual driving is being performed, and switching from manual driving to automated driving is performed. This switching may be performed based on a determination result of the automated driving system or may be performed based on a driver's intention. When manual driving is performed, the automated driving system may perform control for supporting a driver's operation.

The remote support server 3 is a computer having a configuration for performing a "mediation process" between requests for support (the support requests RQ_2A to RQ_2D in FIG. 2) from the plurality of vehicles 2 and the support devices 4 (operators OP) performing support in response thereto. Details of the mediation process will be described later.

The plurality of support devices 4 is a computer having a configuration for performing remote support of a vehicle 2 having transmitted a support request when the support device performing support in response to the support request has been determined. The plurality of support devices 4 includes, for example, a display and an input device. The operator OP ascertains a surrounding environment of the vehicle 2 based on information displayed on the display and inputs a support instruction for the vehicle 2 by operating the input device. When a support instruction is input, the support device 4 generates support instruction information IAS based on the support instruction and transmits the support instruction information to the vehicle 2. The support instruction information IAS is included in the communication information COM4.

1-2. Case in Which Remote Support is Performed

When it is determined that remote support is necessary, the plurality of vehicles 2 transmits support request information IRQ and vehicle information IVH to the remote support server 3. The support request information IRQ and the vehicle information IVH are included in the communication information COM2. The support request information IRQ includes, for example, information indicating details of remote support (hereinafter also referred to as "support detail information CNT") which is desired by a vehicle 2 and information of an operation scheduled to be performed by the vehicle 2 (hereinafter also referred to as "scheduled operation information APN"). The vehicle information IVH includes, for example, position and traveling direction information LCT of a vehicle 2 and surrounding image information IMG of the vehicle 2.

An example of details of remote support in the support detail information CNT is determination support of a vehicle 2. For example, it is conceived that the vehicle 2 temporarily stops on a road shoulder for passengers to board or alight. In this case, it is predicted that an operator OP is requested to determine whether the vehicle 2 is to start and autonomous traveling is to start after boarding/alighting has ended. For example, it is conceived that the vehicle 2 temporarily stops behind an obstacle such as a parked vehicle. In this case, it is predicted that an operator OP is requested to determine whether the vehicle 2 is to start and autonomous traveling is to start to avoid the obstacle.

Figure 3:
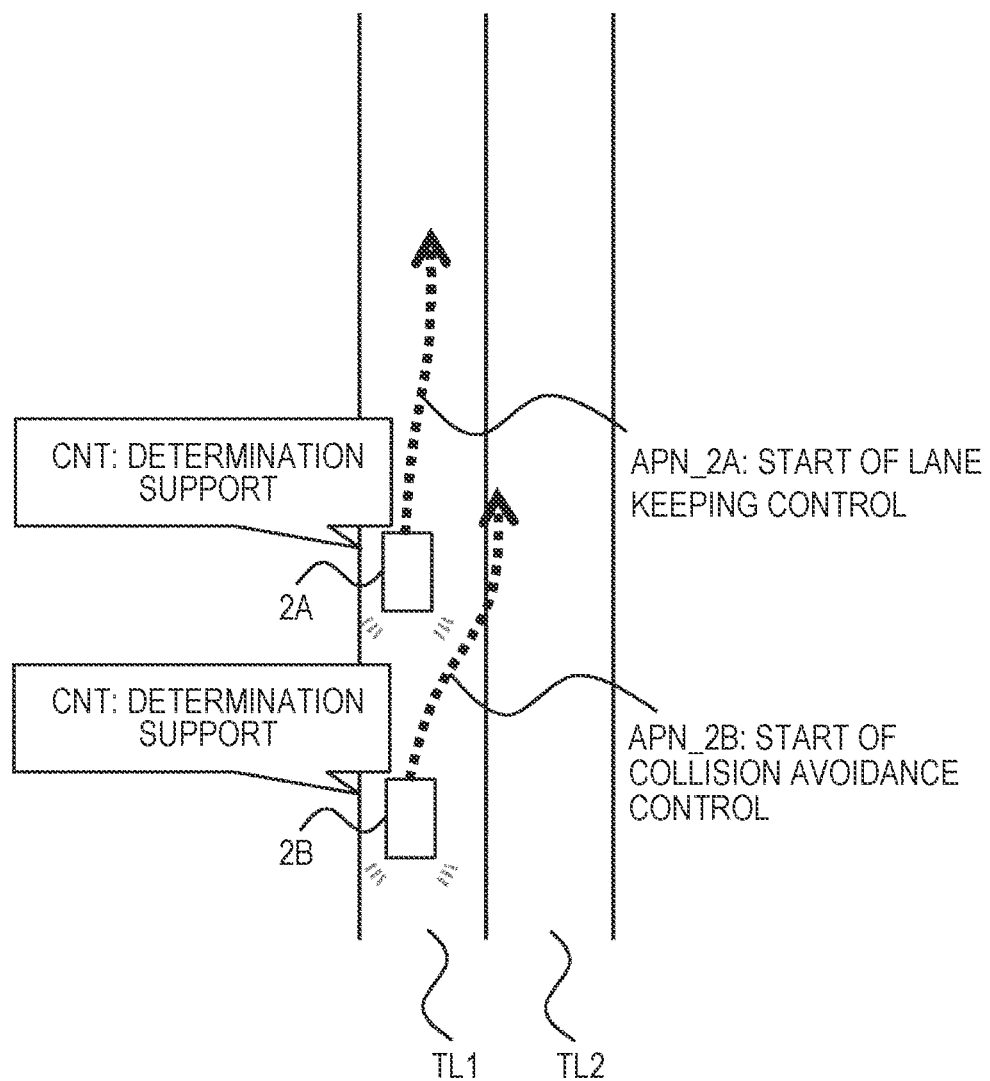
FIG. 3 is a diagram illustrating a first example of remote support according to an embodiment.

FIG. 3 is a diagram illustrating a first example of remote support according to the embodiment. Vehicles 2A and 2B are illustrated in FIG. 3. The vehicle 2A temporarily stops on a road shoulder of a lane TL1 and requests remote support. Support detail information CNT of the vehicle 2A is support for determination of whether the vehicle 2A is to start. The vehicle 2B temporarily stops behind the vehicle 2A, and the vehicle 2B requests remote support similarly to the vehicle 2A. Support detail information CNT of the vehicle 2B is support for determination of whether the vehicle 2B is to start. The vehicle 2A and the vehicle 2B have different situations, and the vehicle 2A is a forward obstacle to the vehicle 2B.

In the example illustrated in FIG. 3, support requests from the vehicles 2A and 2B which temporarily stop at close positions are issued in the same time period. The "same time period" is defined by a predetermined time width (for example, several seconds to several tens of seconds). Determination of a support device 4 which performs support in response to one support request is performed after a predetermined time has elapsed from a time at which the support request has been received. Specifically, a second support request received in a waiting time period for determination of the support device 4 to perform support in response to the first support request is considered as a support request issued in the "same time period" as the first support request.

In the example illustrated in FIG. 3, the support detail information CNT of the vehicle 2A and the support detail information CNT of the vehicle 2B are the same determination support for starting. The situations of the vehicles are different, and an operator OP in charge has difficulty instantaneously ascertaining for what purpose to perform determination support. In this embodiment, scheduled operation information APN is used to facilitate the ascertainment. The scheduled operation information APN is estimated, for example, based on a traveling trajectory, a traveling plan, and the like of the vehicle 2 having requested remote support. The scheduled operation information APN is generated by the automated driving system of the vehicle 2 having requested the remote support. The scheduled operation information APN_2A of the vehicle 2A is "start of lane keeping control," and the scheduled operation information APN_2B of the vehicle 2B is "start of collision avoidance control."

An example in which a support request from a vehicle 2 has been received and a support request from another vehicle 2 temporarily stopping at a position close to the vehicle 2 has been issued in the same time period is passage through a crossroad. A crossroad is an example of a "traffic regulation spot" in the claims. For example, it is conceived that a plurality of vehicles 2 temporarily stops in the vicinity of an entrance of a crossroad to pass through the crossroad. In this case, it is predicted that operators OP are requested to determine whether the vehicles 2 are to start and autonomous traveling is to start.

Figure 4:
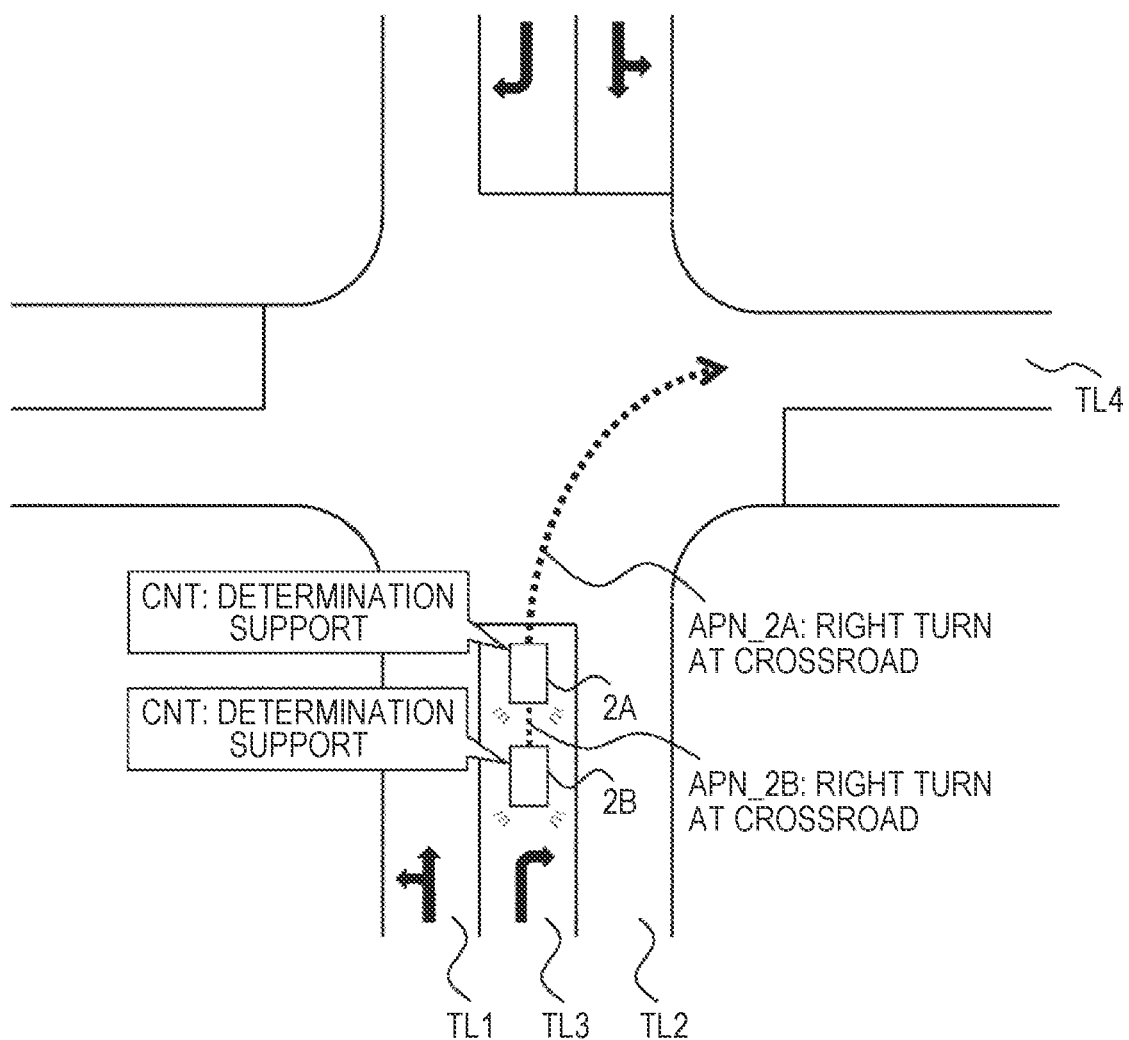
FIG. 4 is a diagram illustrating a second example of remote support according to the embodiment.

FIG. 4 is a diagram illustrating a second example of remote support according to the embodiment. Vehicles 2A and 2B are illustrated in FIG. 4 similarly to FIG. 3. The vehicle 2A temporarily stops on a lane TL3 (a dedicated right-turn lane) and requests remote support. Support detail information CNT of the vehicle 2A is support for determination of whether the vehicle 2A is to start. The vehicle 2B temporarily stops behind the vehicle 2A, and the vehicle 2B requests remote support similarly to the vehicle 2A. Support detail information CNT of the vehicle 2B is support for determination of whether the vehicle 2B is to start. The vehicle 2A and the vehicle 2B have different situations, and the vehicle 2B starts after the vehicle 2A starts.

In the example illustrated in FIG. 4, scheduled operation information APN_2A of the vehicle 2A is "start of automated driving control for right turn at crossroad," and scheduled operation information APN_2B of the vehicle 2B is "start of automated driving control for right turn at crossroad after start of right turn of preceding vehicle." With the scheduled operation information APN_2A and APN_2B, one or two operators OP in charge of the vehicles 2A and 2B can instantaneously determine the situations of the corresponding vehicles (the waiting order of right turn).

Figure 5:
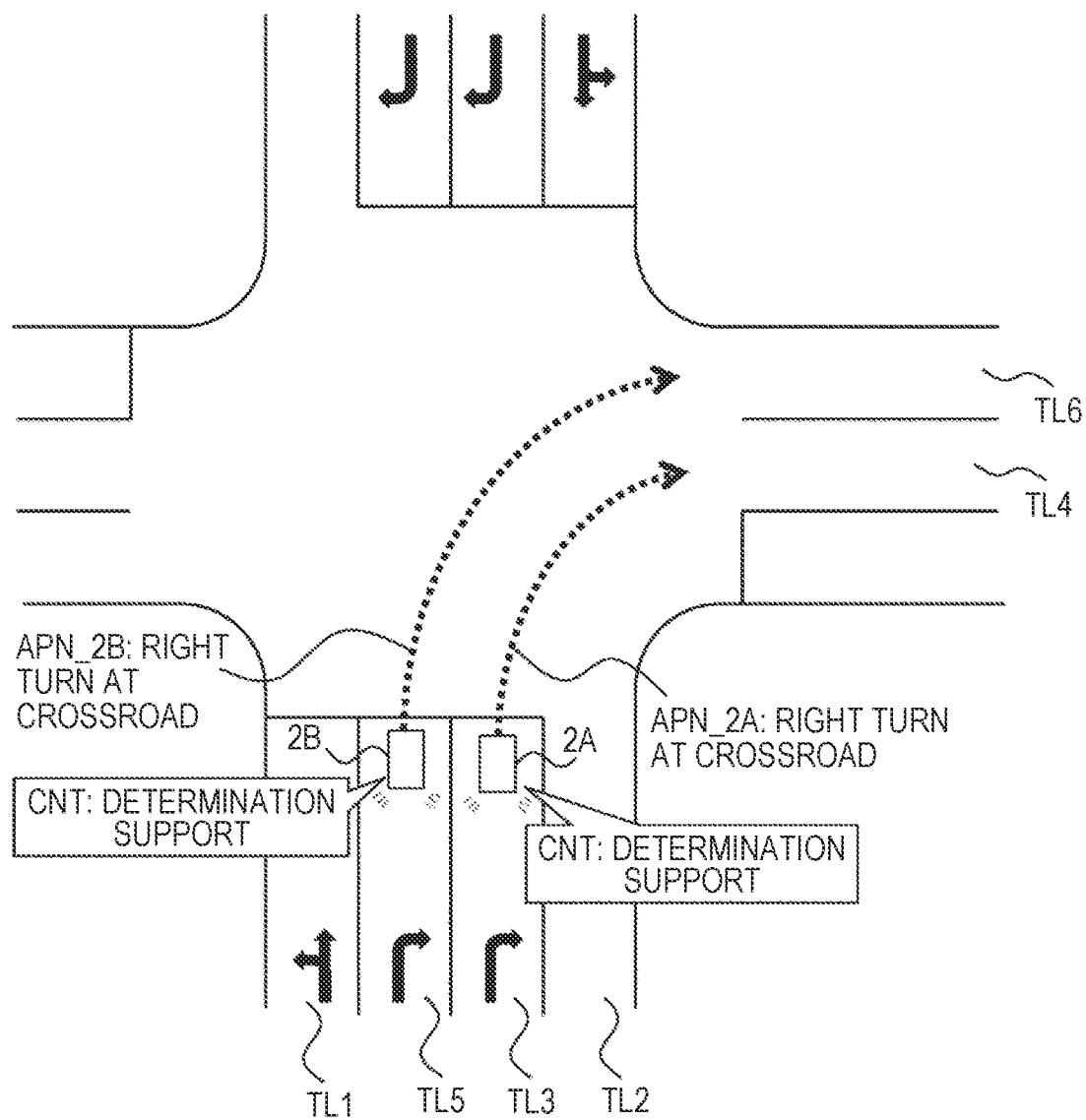
FIG. 5 is a diagram illustrating a third example of remote support according to the embodiment.

FIG. 5 is a diagram illustrating a third example of remote support according to the embodiment. Vehicles 2A and 2B are illustrated in FIG. 5 similarly to FIGS. 3 and 4. The vehicle 2A temporarily stops on a lane TL3 and requests remote support. The support detail information CNT of the vehicle 2A is support for determination of whether the vehicle 2A is to start. The same as in the example illustrated in FIG. 4 is true hitherto. The vehicle 2B stops on a lane TL5 (a dedicated right-turn lane) near the lane TL3 and requests remote support. The support detail information CNT of the vehicle 2B is support for determination of whether the vehicle 2B is to start.

In the example illustrated in FIG. 5, both the scheduled operation information APN_2A of the vehicle 2A and the scheduled operation information APN_2B of the vehicle 2B are "start of automated driving control for right turn at crossroad." The example illustrated in FIG. 5 and the example illustrated in FIG. 4 are the same in that the support requests from the vehicles 2A and 2B temporarily stopping at close positions are issued in the same time period. They are different in the lanes (that is, the lanes TL3 and TL5) in which the vehicle 2A and the vehicle 2B temporarily stop and lanes which are right turn destinations (that is, lanes TL4 and TL6).

Figure 6:
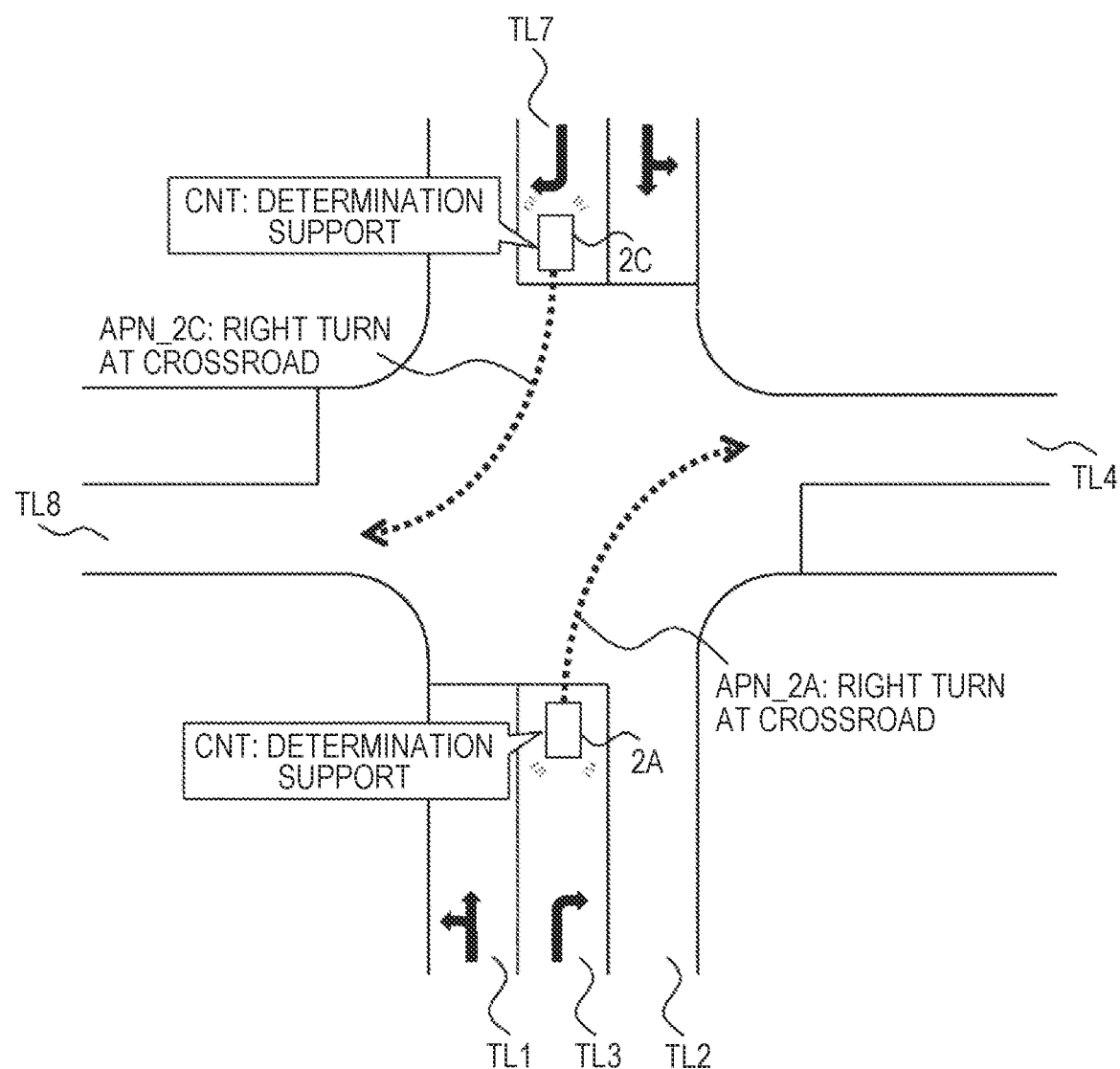
FIG. 6 is a diagram illustrating a fourth example of remote support according to the embodiment.

A fourth example is considered as an example close to the example illustrated in FIG. 5. FIG. 6 is a diagram illustrating a fourth example of remote support according to the embodiment. Vehicles 2A and 2C and lanes TL1, TL2, TL3, TL4, TL7, and TL8 are illustrated in FIG. 6. The vehicle 2A temporarily stops on a lane TL3 and requests remote support. The support detail information CNT of the vehicle 2A is support for determination of whether the vehicle 2A is to start. The same as in the example illustrated in FIG. 4 is true hitherto. The vehicle 2C stops on a lane TL7 (a dedicated right-turn lane) opposite to the lane TL3 with a crossroad interposed therebetween and requests remote support. The support detail information CNT of the vehicle 2C is support for determination of whether the vehicle 2C is to start.

Both the scheduled operation information APN_2A of the vehicle 2A and the scheduled operation information APN_2C of the vehicle 2C are "start of automated driving control for right turn at crossroad." In the example illustrated in FIG. 6, the vehicle 2A and the vehicle 2C are located with the crossroad interposed therebetween, but the vehicles may be considered to temporarily stop at close positions.

Figure 7:
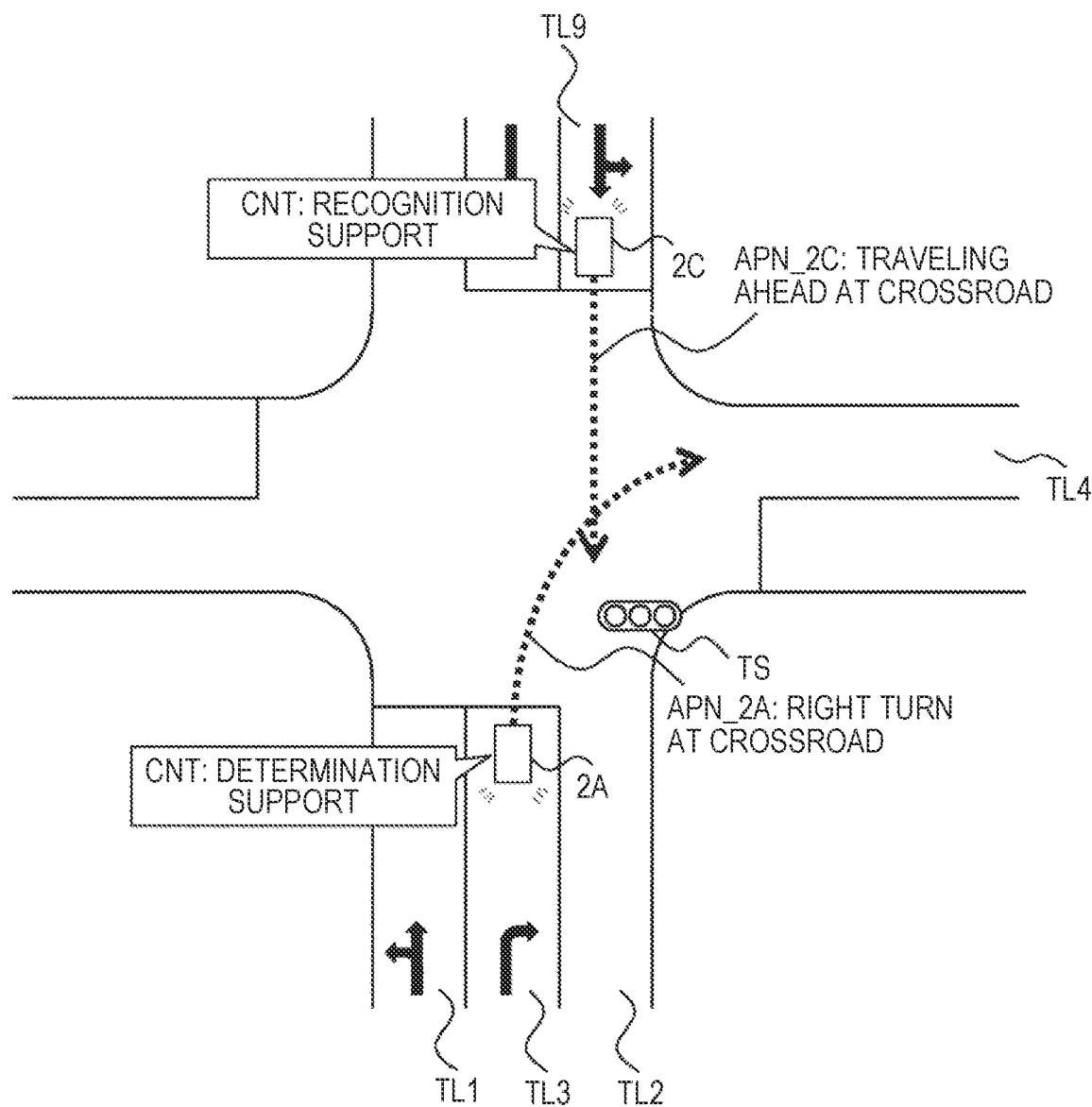
FIG. 7 is a diagram illustrating a fifth example of remote support according to the embodiment.

A fifth example is considered as an example close to the example illustrated in FIG. 5. FIG. 7 is a diagram illustrating a fifth example of remote support according to the embodiment. Vehicles 2A and 2C are illustrated in FIG. 7 similarly to FIG. 6. The vehicle 2A temporarily stops on a lane TL3 and requests remote support. The support detail information CNT of the vehicle 2A is support for determination of whether the vehicle 2A is to start. The same as in the example illustrated in FIG. 4 is true hitherto. The vehicle 2C stops on a lane TL9 (a straight and left-turn lane) opposite to a lane TL2 with a crossroad interposed therebetween and requests remote support. The lane TL2 is a lane on the opposite side of the lane TL9. The support detail information CNT of the vehicle 2C is support for recognition of a lighting state of a light emitting unit of a traffic signal TS.

The scheduled operation information APN_2A of the vehicle 2A is "start of automated driving control for right turn at crossroad," and the scheduled operation information APN_2C of the vehicle 2C is "start of automated driving control for traveling straightly at crossroad."

The examples illustrated in FIGS. 3 to 7 are some examples of the embodiment. Another example is a combination of a vehicle 2A that temporarily stops for the purpose of support for recognition of a lighting state of a light emitting unit of a traffic signal provided on a road shoulder of a lane except for a crossroad and a vehicle 2B that temporarily stops behind the vehicle 2A. A spot in which traveling is regulated by the traffic signal is an example of the "traffic regulation spot" in the claims.

Another example of the embodiment is a combination of a vehicle 2A that temporarily stops before a crosswalk while waiting for crossing motions of pedestrians and the like and a vehicle 2B that temporarily stops behind the vehicle 2A. An example close to this example is a combination of a vehicle 2A that temporarily stops before a crosswalk provided at a crossroad and a vehicle 2B that temporarily stops for right turn at the crossroad.

1-3. Mediation Process

In a mediation process which is performed by the remote support server 3, when a support request from one vehicle 2 has been received, one support device 4 to perform support in response thereto is determined. Then, communication information COM2 and COM4 to be exchanged are relayed therebetween. When support requests from at least two vehicles 2 have been received in the same time period, at least one support device 4 to perform support in response thereto is determined.

Here, all the examples in which the driving support is performed are associated with a support request from another vehicle 2 that temporarily stops at a position close to a vehicle 2 associated with a support request, and the support requests are issued in the same time period. Therefore, in the mediation process, determination of a support device 4 is performed such that the total number of support devices 4 TN4 is equal to or less than the total number of support requests TN2 to efficiently perform support in response to the support requests.

Whether at least two vehicles 2 are present at close positions is determined based on position and traveling direction information LCT included in vehicle information IVH. For example, when a distance between two vehicles 2 is equal to or less than a predetermined distance, it can be determined that the two vehicles 2 are present at close positions. The predetermined distance may be a fixed value or may be set to be variable based on map information of a spot in which the vehicles 2 temporarily stop. Whether support requests from at least two vehicles 2 are issued in the same time period can be determined, for example, based on the predetermined time.

In the mediation process, when support requests from at least two vehicles 2 satisfying the aforementioned time period and positional conditions are received, the vehicles 2 are organized d into the same group (the same cluster). This organization can be performed based on the map information and the position and traveling direction information LCT. In the mediation process, the "support order" of the at least two vehicles 2 organized into the same group is additionally determined. This determination of the support order may be performed, for example, based on the map information and the position and traveling direction information LCT.

Based on the map information and the position and traveling direction information LCT, lanes in which at least two vehicles 2 allocated to the same group are present and traveling directions of the vehicles 2 can be identified. Accordingly, when the vehicles 2 are present on the same lane and the traveling directions of the vehicles 2 are the same (for example, the examples illustrated in FIGS. 3 and 4), the support order can be determined sequentially from the vehicle 2 located at the head. On the other hand, when the vehicles 2 are not located on the same lane or the traveling directions of the vehicles 2 are the same (for example, the example illustrated in FIG. 5), the support order can be determined as the elapse order of times at which the support requests are received by the remote support server 3.

For example, the support order may be determined based on the map information, the position and traveling direction information LCT, and the scheduled operation information APN. Based on these pieces of information, lanes in which at least two vehicles 2 allocated to the same group are present, the traveling directions of the vehicles 2, and situations of the vehicles 2 can be identified. Accordingly, for example, when the vehicles 2 are not located on the same lane or the traveling directions of the vehicles 2 are different (for example, the examples illustrated in FIGS. 6 and 7), the support order can be determined based on a combination of the times at which the support requests are received by the remote support server 3 and the situations of the vehicles 2.

Specifically, in the example illustrated in FIG. 6, both the scheduled operation information APN_2A of the vehicle 2A and the scheduled operation information APN_2C of the vehicle 2C are "start of automated driving control for right turn at crossroad." That is, the situations of the vehicles 2A and 2C are the same. Therefore, in this example, the support order is determined as the elapse order of times at which the support requests are received by the remote support server 3.

On the other hand, in the example illustrated in FIG. 7, the scheduled operation information APN_2A of the vehicle 2A is "start of automated driving control for right turn at crossroad," and the scheduled operation information APN_2C of the vehicle 2C is "start of automated driving control for traveling straight at crossroad." That is, the situation of the vehicle 2A is different from that of the vehicle 2C. Therefore, in this example, the support request RQ_2C from the vehicle 2C is first processed and then the support request RQ_2A from the vehicle 2A is processed. This is because traveling straight has priority to right turn in the traffic rules.

For example, a situation in which two vehicles 2A and 2D of which the traveling directions are opposite stop at a crossroad while facing each other and the vehicle 2A is going to turn at the crossroad is conceivable. In this case, the scheduled operation information APN_2A of the vehicle 2A is "start of automated driving control for turn at crossroad," and the scheduled operation information APN_2D of the vehicle 2D is "start of automated driving control for turn at crossroad." In this situation, there is a likelihood that turn trajectories of the vehicles 2A and 2D will be able to cross each other. In this example, priorities of the vehicle 2A and the vehicle 2D are set, and the vehicle with a higher priority is first processed. For example, the priority of the vehicle arriving at the crossroad earlier is set to be higher.

In the mediation process, vehicle information IVH and support request information IRQ of at least two vehicles 2 allocated to the same group are transmitted to one support device 4 (hereinafter also referred to as a "computer in charge") in charge of the group such that remote support for the vehicles 2 is performed in the determined support order. When support instruction information IAS generated in the support order is received from the computer in charge, the support instruction information IAS is sequentially transmitted to the vehicles 2 to be supported.

In this way, with the mediation process, when support requests from at least two vehicles 2 that temporarily stop at close positions are issued in the same time period, grouping of the vehicles 2 and determination of the support order in the same group are performed. Accordingly, it is possible to efficiently perform support in response to the support requests. This results in a decrease in a burden on operators OP who process the support requests, and thus it is expected to contribute to smooth operating of a remote support service.

Figure 8:
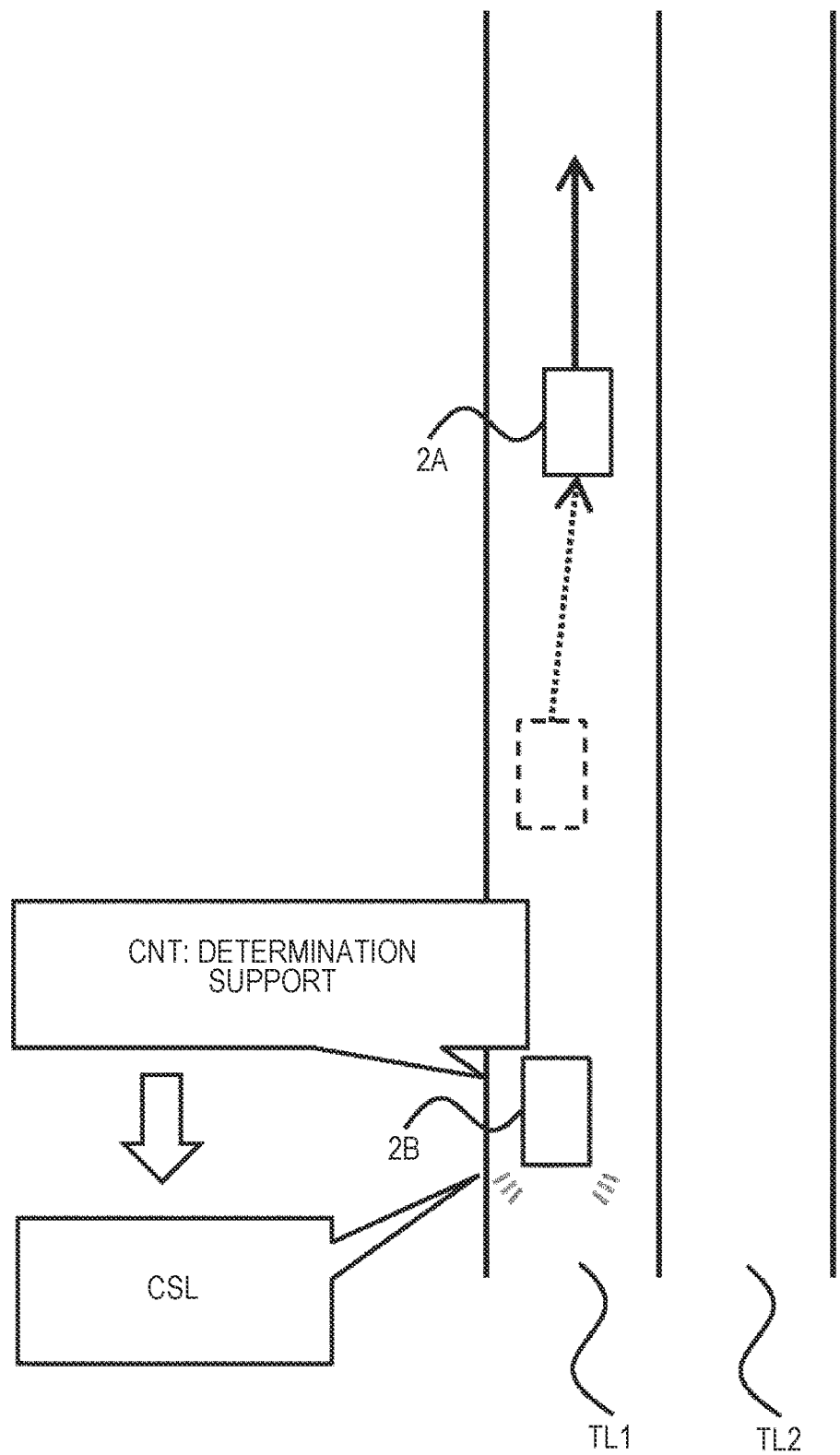
FIG. 8 is a diagram illustrating secondary effects of a mediation process.
Figure 9:
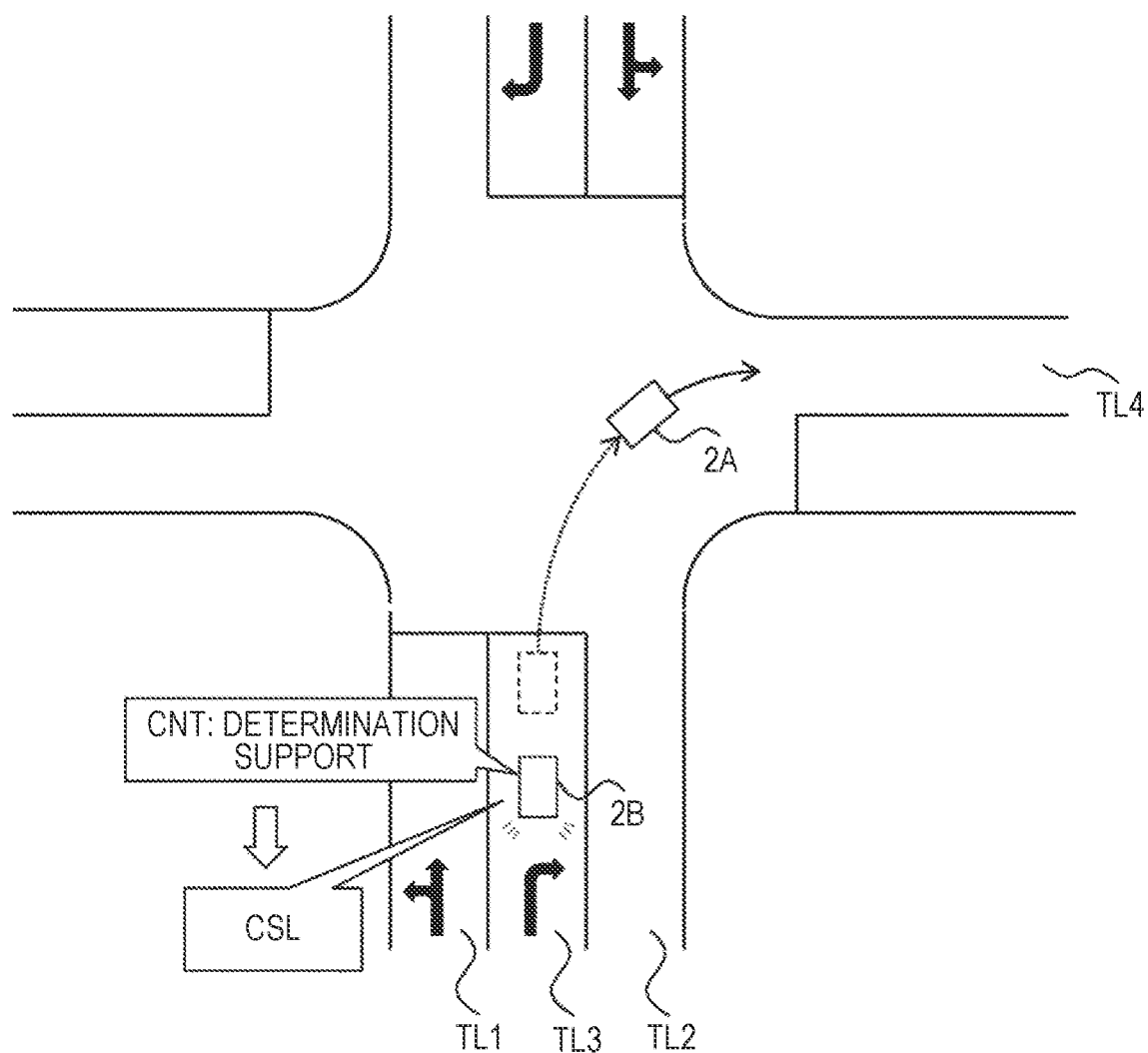
FIG. 9 is a diagram illustrating secondary effects of the mediation process.

Particularly, with the mediation process, the support order in the same group is determined based on the map information, the position and traveling direction information LCT, or the scheduled operation information APN. Accordingly, cancellation of a support request is expected with progress of support in response to the support requests in the same group. FIGS. 8 and 9 are diagrams illustrating secondary effects of the mediation process. FIG. 8 corresponds to the example of remote support described above with reference to FIG. 3. FIG. 9 corresponds to the example of remote support described above with reference to FIG. 4.

In the example illustrated in FIG. 8, by performing the remote support of the vehicle 2A, the vehicle 2A starts and lane keeping control along a lane TL1 is started. In the example illustrated in FIG. 9, by performing the remote support of the vehicle 2A, the vehicle 2A starts and automated driving control for right turn at the crossroad is started. In both the examples, the vehicle 2A does not serve as an obstacle in front of the vehicle 2B and thus the reason for the support request RQ_2B of the vehicle 2B is resolved. Then, the vehicle 2B can start automated driving control based on the determination of the automated driving system. When the automated driving control is started, an operator OP does not need to process the support request RQ_2B. This results in a decrease in a burden on the operators OP.

When a support request is canceled, the corresponding vehicle 2 transmits support cancellation information CSL indicating information for canceling the support request to the remote support server 3. The support cancellation information CSL is included in the communication information COM2. When the support cancellation information CSL is received, the remote support server 3 transmits the received information to a computer in charge.

The remote support server, the remote support method, and the remote support program according to the embodiment will be described below in detail.

2. Example of System Configuration

2-1. Example of Configuration on Side Provided with Remote Support (Vehicle)

Figure 10:
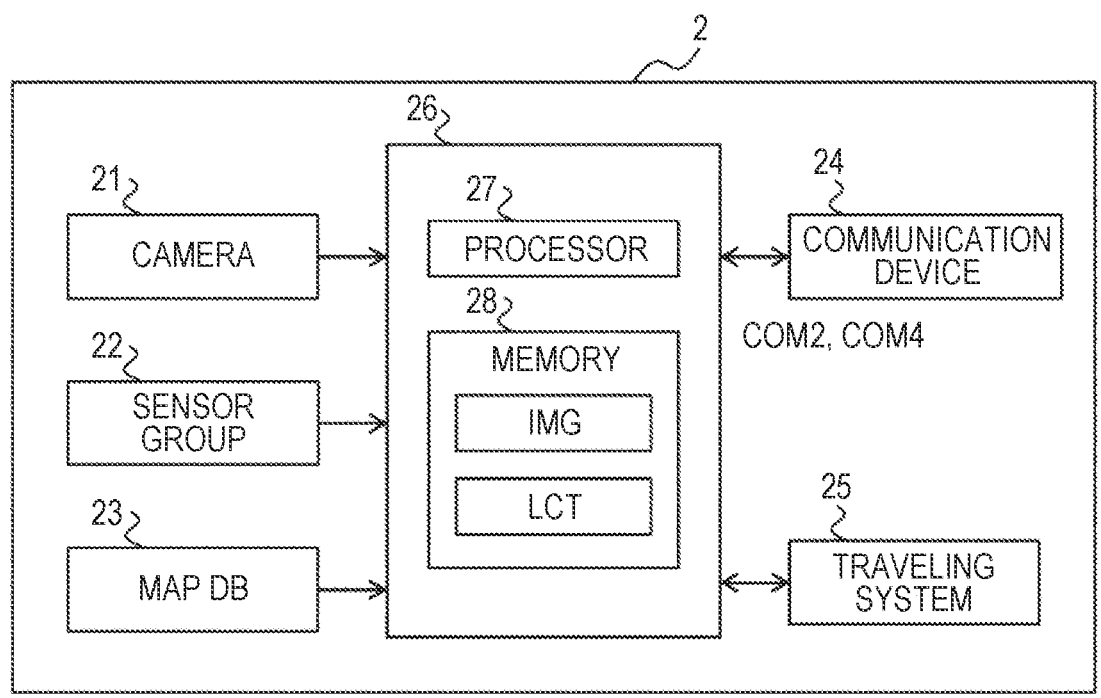
FIG. 10 is a block diagram illustrating an example of a configuration associated with autonomous traveling of a vehicle illustrated in FIG. 1.

FIG. 10 is a block diagram illustrating an example of a configuration associated with autonomous traveling of a vehicle 2 illustrated in FIG. 1. In the example illustrated in FIG. 10, the vehicle 2 includes a camera 21, a sensor group 22, a map database (DB) 23, a communication device 24, a traveling system 25, and an information processing device 26. Elements such as the camera 21 and the sensor group 22 and the information processing device 26 are connected to each other, for example, via an onboard network (for example, a controller area network (CAN)).

The camera 21 captures an outside image (a moving image) of the vehicle 2. At least one camera 21 is provided to capture at least a front view image of the vehicle 2. The front-view camera 21 is provided, for example, on the rear surface of a front windshield of the vehicle 2. The outside image captured by the camera 21 is typically a moving image. Here, the outside image may be a still image. Information of the outside image acquired by the camera 21 corresponds to the surrounding image information IMG The sensor group 22 includes a state sensor that detects a state of the vehicle 2. Examples of the state sensor include a speed sensor, an acceleration sensor, a yaw rate sensor, and a steering angle sensor. The sensor group 22 further includes a position sensor that acquires the position and traveling direction information LCT of the vehicle 2. An example of the position sensor is a global navigation satellite system (GNSS) sensor. The sensor group 20 may further include a recognition sensor other than the camera 21. The recognition sensor recognizes (detects) an object near the vehicle 2 using radio waves or light. Examples of the recognition sensor include a millimeter wave radar and a Laser Imaging Detection and Ranging (LIDAR). In the following description, information acquired by the recognition sensor is also referred to as "outside recognition information RCG."

Map information is stored in the map DB 23. Examples of the map information include position information of roads, shape information of the roads (for example, types of a curve and a straight line), and position information of crossroads and structures. The map DB 23 is provided in an onboard storage device (for example, a nonvolatile recording medium such as a hard disk or a flash memory). The map DB 23 may be provided in a computer (for example, the remote support server 3) that can communicate with the vehicle 2.

The communication device 24 performs radio communication with a base station (not illustrated) of the network 5. Examples of a communication standard of the radio communication include mobile communication standards such as 4G, LTE, and 5G. A connection destination of the communication device 24 includes the remote support server 3. In communication with the remote support server 3, the communication device 24 transmits the communication information COM2 received from the information processing device 26 to the remote support server 3.

The traveling system 25 performs acceleration, deceleration, and steering of the vehicle 2. The traveling system 25 includes, for example, a drive device, a steering device, and a brake device. The drive device drives tires of the vehicle 2. The steering device turns the tires of the vehicle 2. The brake device applies a braking force to the vehicle 2. Acceleration of the vehicle 2 is performed by controlling the drive device. Deceleration of the vehicle 2 is performed by controlling the brake device. When the drive device is a motor, braking of the vehicle 2 may be performed using a regenerative brake by controlling the motor. Steering of the vehicle 2 is performed by controlling the steering device.

The information processing device 26 is a computer for processing various types of information acquired by the vehicle 2. The information processing device 26 includes at least one processor 27 and at least one memory 28. The processor 27 includes a central processing unit (CPU). The memory 28 is a volatile memory such as a DDR memory and performs loading of various programs used by the processor 27 and temporary storage of various types of information. Various types of information acquired by the vehicle 2 are stored in the memory 28. These various types of information include surrounding image information IMG and position and traveling direction information LCT.

The processor 27 performs an automated driving control process of the vehicle 2 by executing a program stored in the memory 28. The processor 27 determines whether remote support is to be performed by executing a program stored in the memory 28. When it is determined that remote support is to be performed, the processor 27 generates support request information IRQ based on various types of information stored in the memory 28. The support request information IRQ includes, for example, support detail information CNT and scheduled operation information APN. The support detail information CNT is generated, for example, based on outside recognition information RCG from the sensor group 22 (specifically, the recognition sensor). The scheduled operation information APN is generated, for example, based on a traveling trajectory and a traveling plan of the vehicle 2.

When it is determined that remote support is to be performed, the processor 27 encodes the support request information IRQ and the vehicle information IVH and outputs the encoded information to the communication device 24. In the encoding process, the information may be compressed. The encoded information is included in the communication information COM2. The process of encoding the support request information IRQ and the vehicle information IVH may not be performed using the processor 27 and the memory 28. For example, such a process may be performed through a software process using a graphics processing unit (GPU) or a digital signal processor (DSP) or a hardware process using an ASIC or an FPGA.

2-2. Example of Configuration on Side Providing Remote Support (Remote Support Server and Support Device)

Figure 11:
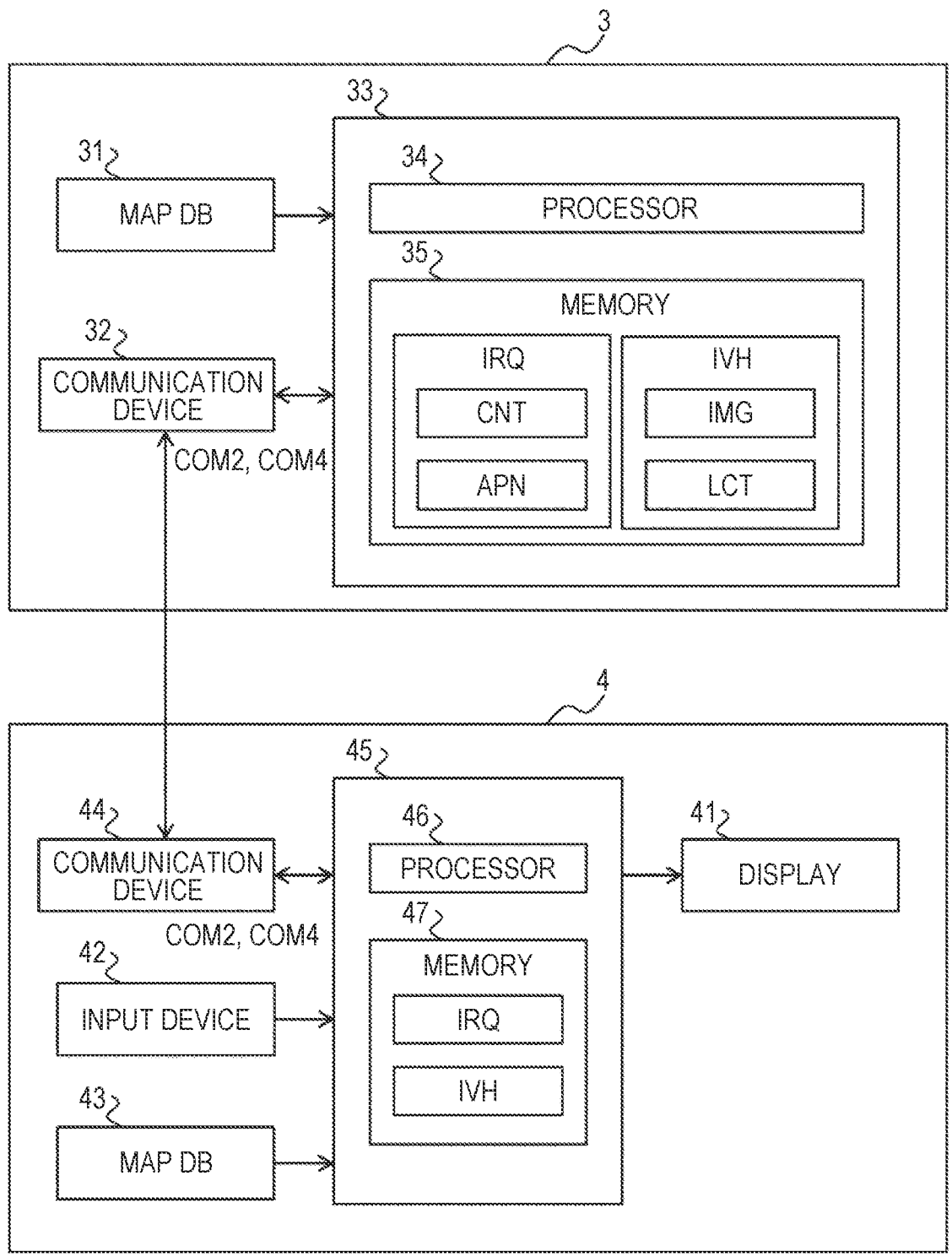
FIG. 11 is a block diagram illustrating an example of a configuration of a remote support server and a support device illustrated in FIG. 1.

FIG. 11 is a block diagram illustrating an example of a configuration of the remote support server 3 and the support device 4 illustrated in FIG. 1. As illustrated in FIG. 11, the remote support server 3 includes a map DB 31, a communication device 32, and an information processing device 33. The support device 4 includes a display 41, an input device 42, a map DB 43, a communication device 44, and an information processing device 45.

An example of the configuration of the remote support server 3 will be first described below. Map information is stored in the map DB 31. An example of the map information is information stored in the map DB 23. The map DB 31 is formed in a predetermined storage device (for example, a nonvolatile recording medium such as a hard disk or a flash memory).

The communication device 32 performs radio communication with a base station of the network 5. Examples of a communication standard of the radio communication include mobile communication standards such as 4G, LTE, and 5G. A communication destination of the communication device 32 includes the vehicle 2. In communication with the vehicle 2, the communication device 32 receives the communication information COM2 from the vehicle 2. The communication device 32 communicates with the support device 4. In communication with the support device 4, the communication device 32 receives communication information COM4 from the support device 4. The communication information COM4 is transmitted to the vehicle 2.

The information processing device 33 is a computer that processes various types of information associated with remote support. The information processing device 33 includes at least one processor 34 and at least one memory 35. The basic configuration of the information processing device 33 is the same as that of the information processing device 26. Various programs used by the processor 34 and various types of information are stored in the memory 35. The various programs include a remote support program according to the embodiment. These various types of information include support request information IRQ (support detail information CNT and scheduled operation information APN) and vehicle information IVH (surrounding image information IMG and position and traveling direction information LCT). The memory 35 is an example of a storage medium.

The processor 34 performs the mediation process. A specific processing example in which the processor 34 performs the mediation process will be described later.

An example of the configuration of the support device 4 will be described below. The display 41 displays surrounding image information IMG of a vehicle 2 under remote support (hereinafter also referred to as a "supported vehicle"). Examples of the display 41 include a liquid crystal display (LCD) and an organic lighting emitting diode (OLED) display. The display 41 includes, for example, three displays that display a front-view image, a right-view image, and a left-view image of a supported vehicle.

The input device 42 is a device that is operated by an operator OP. The input device 42 includes, for example, an input unit that receives a support instruction from the operator OP and a control circuit that generates and outputs support instruction information IAS based on the support instruction. Examples of the input unit include a touch panel, a mouse, a keyboard, buttons, and switches. Examples of an input operation from the operator OP include an operation of moving a cursor displayed on the display 41 and an operation of selecting buttons displayed on the display 41.

Map information is stored in the map DB 43. An example of the map information is information stored in the map DB 23. The map DB 43 is formed in a predetermined storage device (for example, a nonvolatile recording medium such as a hard disk or a flash memory). The map DB 43 may be formed in a computer (for example, the remote support server 3) that can communicate with the support device 4.

The communication device 44 performs radio communication with the communication device 32. This communication may be wired communication or wireless communication. In communication with the communication device 32, the communication device 44 transmits communication information COM2 received from the communication device 32 to the information processing device 45. The communication device 44 transmits communication information COM4 received from the information processing device 45 to the remote support server 3.

The information processing device 45 is a computer that processes various types of information associated with remote support. The information processing device 45 includes at least one processor 46 and at least one memory 47. The basic configuration of the information processing device 45 is the same as that of the information processing device 26. Various programs used by the processor 46 and various types of information are stored in the memory 47. The various types of information include support request information IRQ and vehicle information IVH.

The processor 46 performs a process of decoding the support request information IRQ and the vehicle information IVH and generating an image to be displayed on the display 41. When the support request information IRQ and the vehicle information IVH are compressed, such information is decompressed in the decoding process. The processor 46 outputs the generated image to the display 41. The decoding process and the image generating and displaying process may not be performed using the processor 46 and the memory 47. For example, such processes may be performed through a software process using a GPU or a DSP or a hardware process using an ASIC or an FPGA.

3. Specific Process Examples

Figure 12:
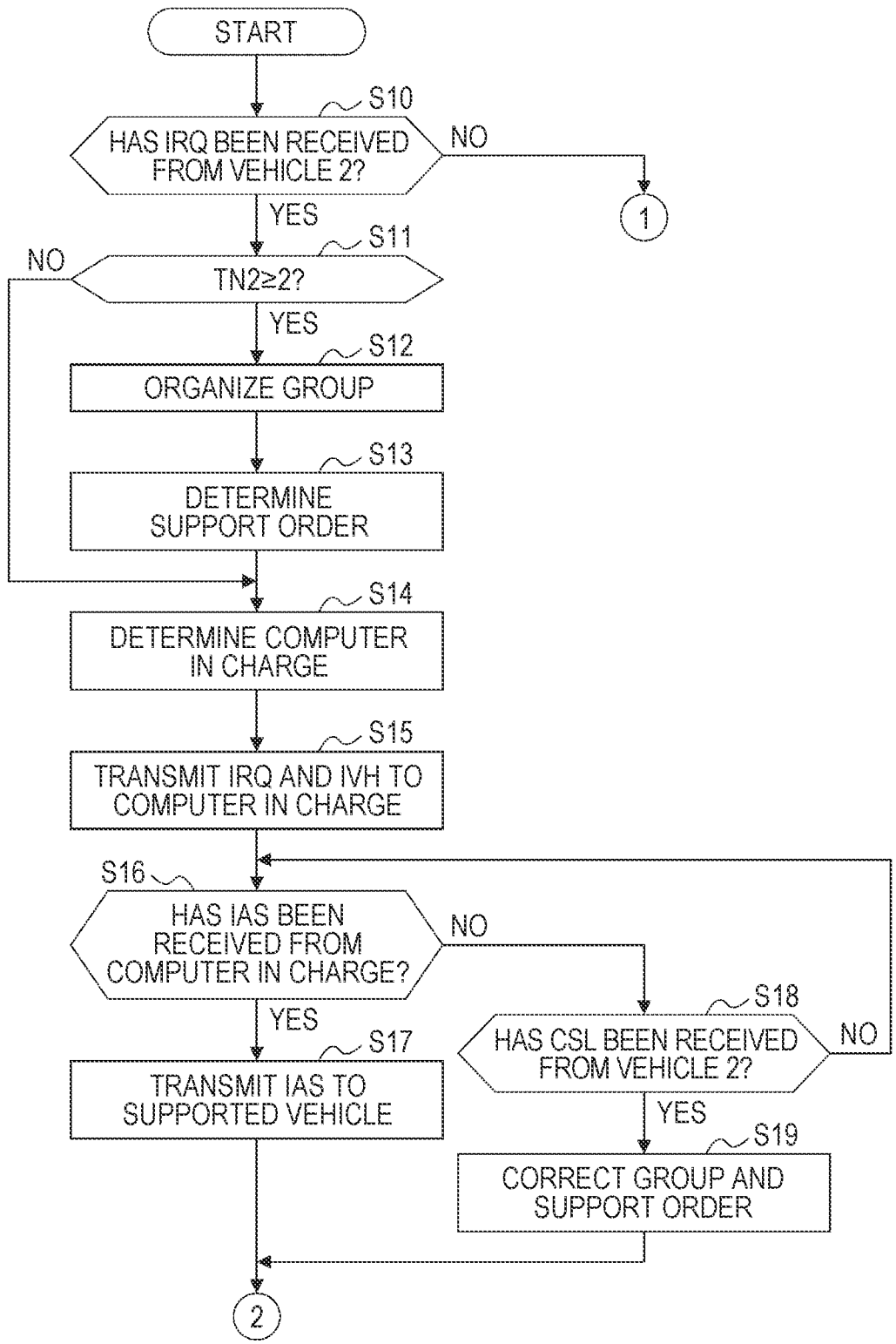
FIG. 12 is a flowchart illustrating an example of a routine of processes which are performed when the remote support server performs a mediation process.
Figure 13:
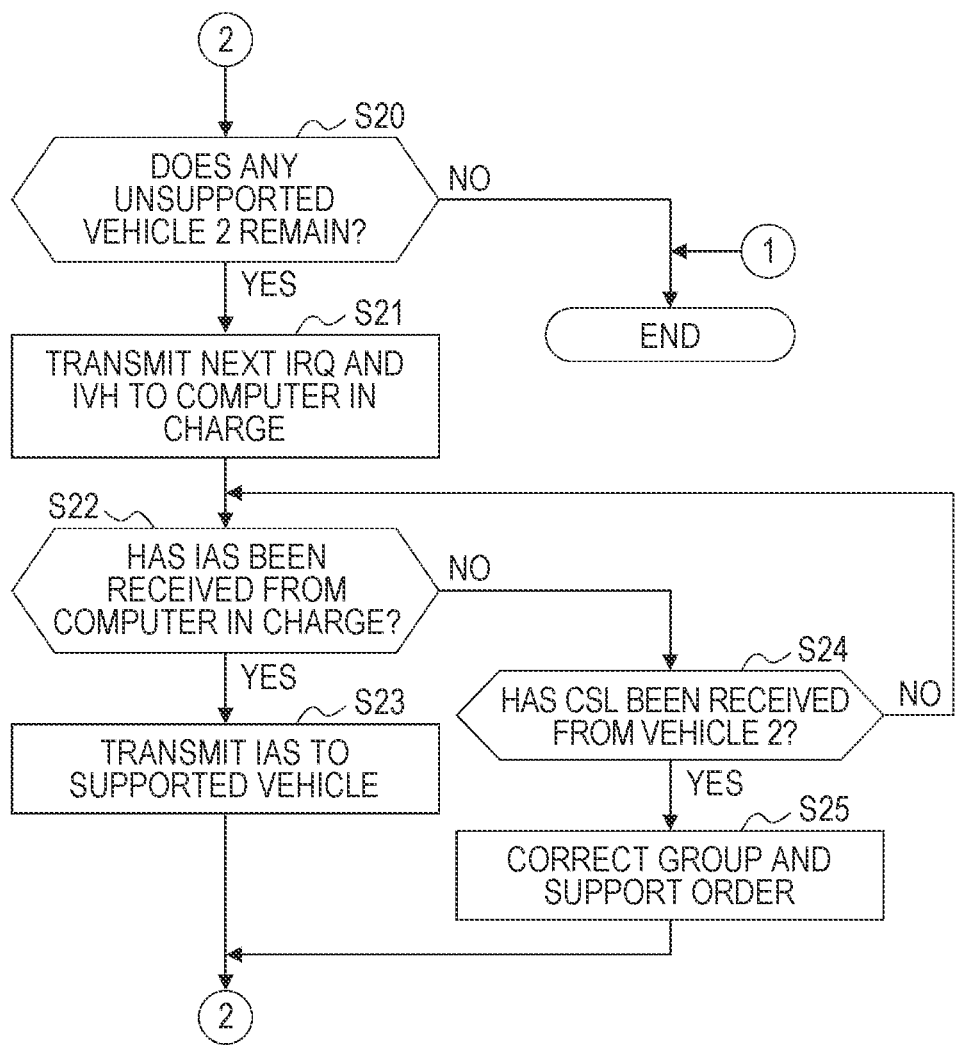
FIG. 13 is a flowchart illustrating an example of a routine of processes which are performed when the remote support server performs a mediation process.

FIGS. 12 and 13 are flowcharts illustrating an example of a routine of processes which is performed when the remote support server 3 (the processor 34) performs the mediation process. The routine illustrated in FIGS. 12 and 13 is repeatedly performed at intervals of a predetermined cycle.

In the routine illustrated in FIGS. 12 and 13, first, it is determined whether support request information IRQ has been received from a vehicle 2 (Step S10). When the determination result of Step S10 is negative, this routine of the mediation process ends.

When the determination result of Step S10 is positive, it is determined whether the total number of support requests TN2 satisfies TN22 (Step S11). The determination of Step S11 is performed depending on whether support request information IRQ has been received from a vehicle 2, for example, until a predetermined time (for example, several seconds to several tens of seconds) elapses from a time point at which support request information IRQ has been received from another vehicle 2. When support request information IRQ has been received from another vehicle 2, it can be considered that two support requests have been issued in the same time period. Accordingly, in this case, the process of Step S12 is performed. Otherwise, the process of Step S14 is performed.

In the process of Step S12, at least two vehicles 2 are grouped. This grouping is performed based on the vehicle information IVH (specifically, the position and traveling direction information LCT) of the at least two vehicles 2 and the map information in the map DB 31. For example, a vehicle 2 of a distance from a reference vehicle 2 from which the support request information IRQ has been received earliest is equal to or less than a predetermined distance is detected. The vehicle 2 of which the distance from the reference vehicle is equal to or less than the predetermined distance is allocated to the same group as the reference vehicle. A vehicle 2 which has not been allocated to the same group as the reference vehicle is allocated to another group using the aforementioned detection technique. By repeating this allocation, the at least two vehicles 2 having transmitted support request information IRQ in the same time period is organized into one group.

Here, the process of Step S12 may be performed as a subroutine process of the routine illustrated in FIGS. 12 and 13. In this case, reorganization of the group in the process of Step S12 may be performed, for example, based on support cancellation information CSL. For example, reorganization of the group may be performed based on lighting color information CLR of a light emitting unit of a traffic signal provided at a crossroad at which the vehicles 2 allocated to the same group temporarily stop. For example, reorganization of the group may be performed based on outside recognition information RCG of the vehicles allocated to the same group.

Figure 14:
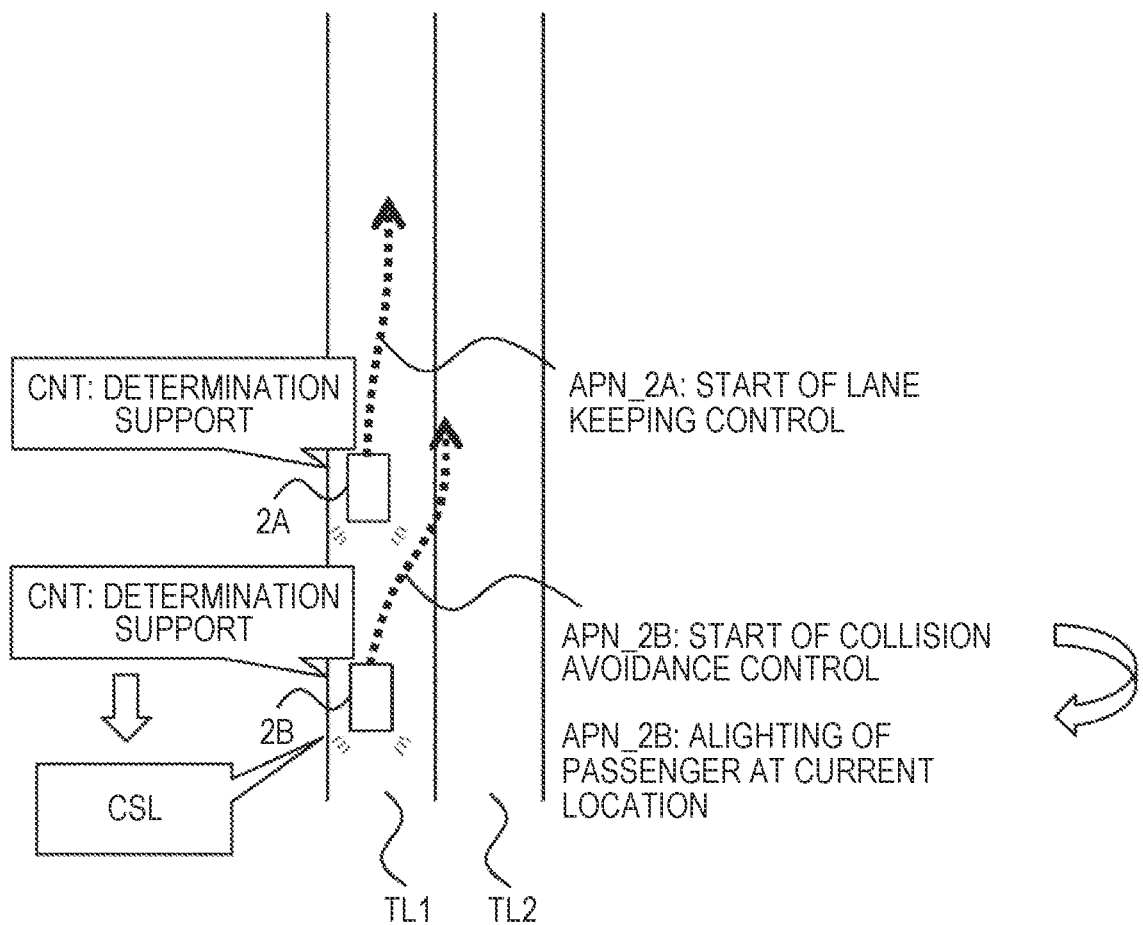
FIG. 14 is a diagram illustrating a first modified example of the process of Step S12 in FIG. 12.

Modified examples of the process of Step S12 will be described below with reference to FIGS. 14 to 16. FIG. 14 is a diagram illustrating a situation in which scheduled operation information APN is updated. For example, when a vehicle 2 is a ride-sharing vehicle such as a taxi or a bus, it is conceivable that expression of a passenger's intention for boarding or alighting is received while it temporarily stops.

FIG. 14 is a diagram illustrating a first modified example of the process of Step S12. FIG. 14 corresponds to the example of remote support described above with reference to FIG. 3. In the example illustrated in FIG. 14, the vehicles 2A and 2B are allocated to the same group. The vehicle 2B is a ride-sharing vehicle and receives intention for alighting from a passenger after transmitting support request information IRQ to the remote support server 3. In this case, the scheduled operation information APN_2B of the vehicle 2B is changed from "start of collision avoidance control" to "alighting of passenger at current location." Then, the vehicle 2B transmits support cancellation information CSL to the remote support server 3 such that the support request RQ_2B is canceled.

When support cancellation information CSL has been received, it means that the vehicle 2B has determined that remote support is not to be performed. In this case, the remote support server 3 (the processor 34) performs reorganization of the group and deletes the vehicle 2B from the group to which the vehicle 2B has been allocated.

Figure 15:
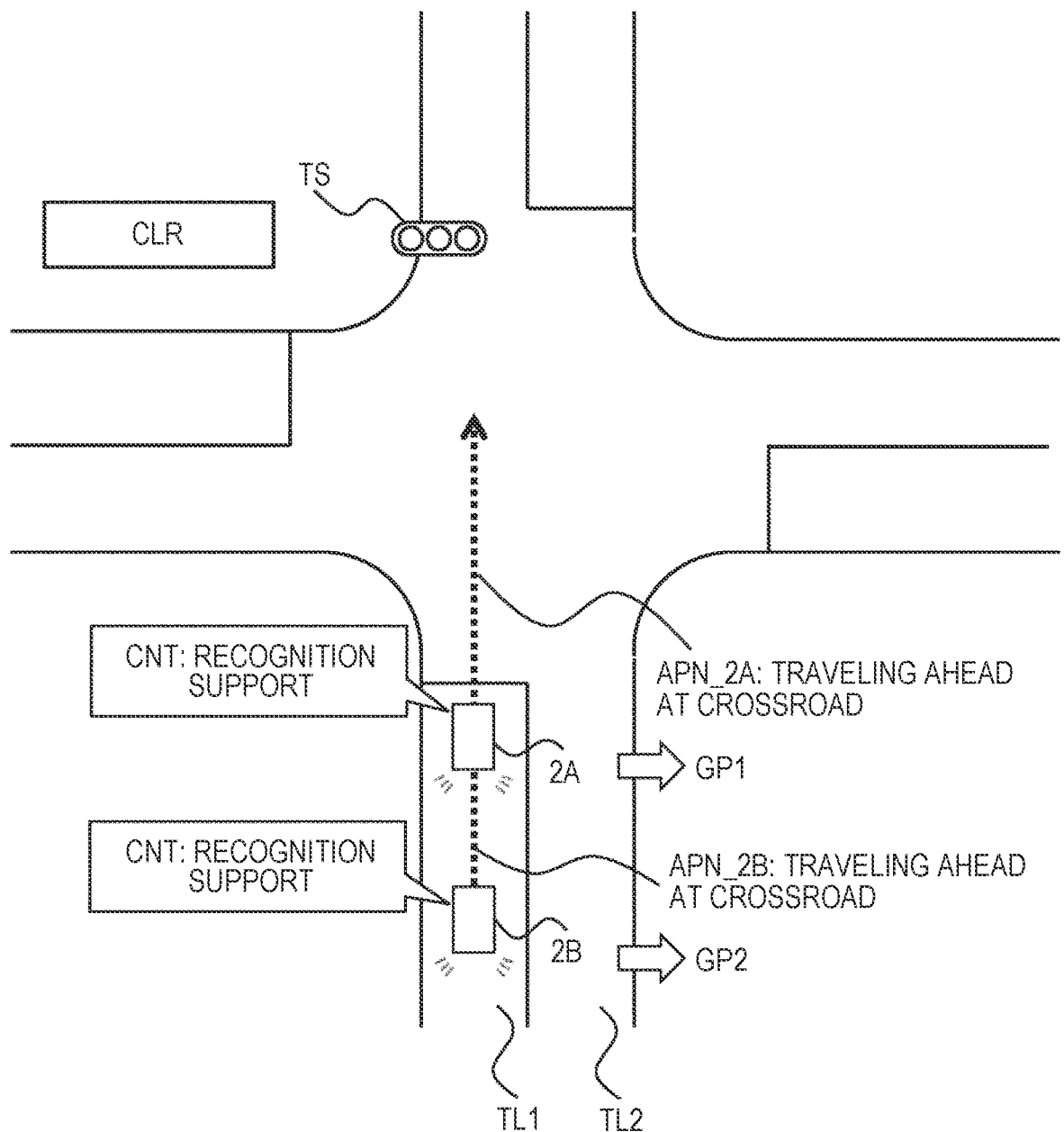
FIG. 15 is a diagram illustrating a second modified example of the process of Step S12 in FIG. 12.

FIG. 15 is a diagram illustrating a second modified example of the process of Step S12. Vehicles 2A and 2B are illustrated in FIG. 15. The vehicle 2A temporarily stops on a lane TL1 and requests remote support. The vehicle 2B temporarily stops behind the vehicle 2A, and the vehicle 2B requests remote support similarly to the vehicle 2A. Both the support detail information CNT of the vehicle 2A and the support detail information CNT of the vehicle 2B are support for recognition of a lighting state of a light emitting unit of a traffic signal TS. Both the scheduled operation information APN_2A of the vehicle 2A and the scheduled operation information APN_2B of the vehicle 2B are "start of automated driving control for traveling straight at crossroad." The vehicles 2A and 2B are allocated to the same group.

In the example illustrated in FIG. 15, the remote support server 3 acquires lighting color information CLR. The lighting color information CLR is provided from a vehicle 2 having transmitted a support request information IRQ to the remote support server 3 or is directly provided from a traffic signal to the remote support server 3. When the lighting color information CLR is provided from a vehicle 2 to the remote support server 3, the lighting color information CLR is included in the communication information COM2. The lighting color information CLR is stored in the memory 35.

Examples of the lighting color information CLR include information of a color of the light emitting unit (for example, green or red) which is currently lighted on and information of a remaining time until the color is changed to another color.

Based on the lighting color information CLR, it can be ascertained that the color of the light emitting unit which is currently lighted on is blue and how long time remains until the color is changed to yellow. In the second modified example, reorganization of a group is performed based on the lighting color information CLR. In the example illustrated in FIG. 15, the vehicles 2A and 2B allocated to the same group are reorganized into Groups GP1 and GP2. Group GP1 is a group of support requests corresponding to a blue lighting color in this time. Group GP2 is a group of support requests corresponding to a blue lighting color in the next time.

Figure 16:
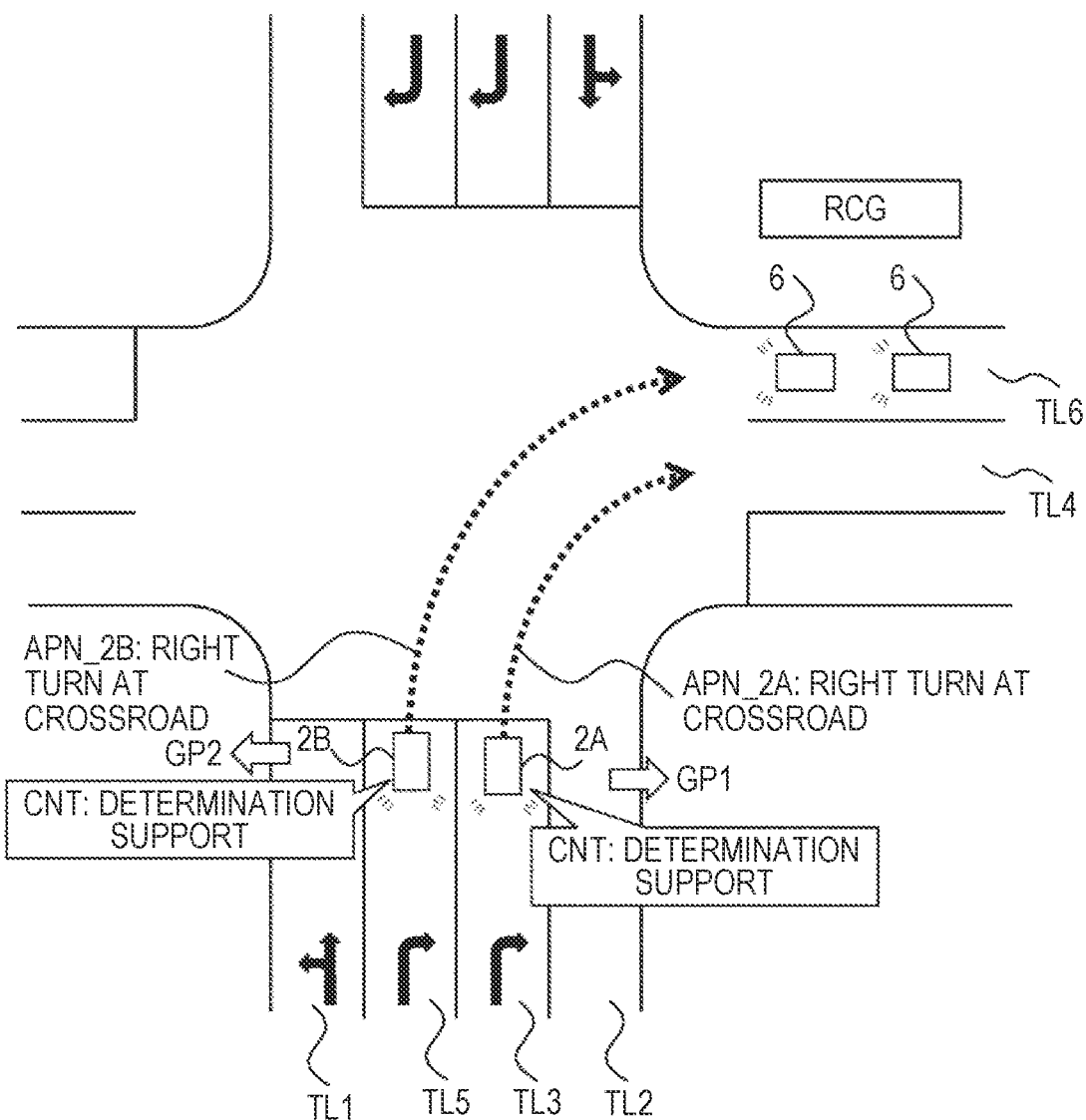
FIG. 16 is a diagram illustrating a third modified example of the process of Step S12 in FIG. 12.

FIG. 16 is a diagram illustrating a third modified example of the process of Step S12. FIG. 16 corresponds to the example of remote support described above with reference to FIG. 5. In the example illustrated in FIG. 16, vehicles 2A and 2B are allocated to the same group. A plurality of vehicles 6 is present on a lane TL6 which is a right turn destination of the vehicle 2B. The plurality of vehicles 6 is general vehicles, and these vehicles form a queue up to the vicinity of an exit of a crossroad.

In the example illustrated in FIG. 16, the remote support server 3 acquires outside recognition information RCG. The outside recognition information RCG is included in the communication information COM2. The outside recognition information RCG along with the support request information IRQ is transmitted from the vehicles 2 to the remote support server 3. The outside recognition information RCG is stored in the memory 35.

In the third modified example, reorganization of a group is performed based on the outside recognition information RCG. In the example illustrated in FIG. 16, the vehicles 2A and 2B allocated to the same group are reorganized into Groups GP1 and GP2. This is because it can be determined that it is difficult for the vehicle 2B to perform "start of automated driving control for right turn at crossroad" based on results of recognition from the plurality of vehicles 6 included in the outside recognition information RCG.

The specific example of the mediation process will be continuously described below with reference back to FIG. 12. In the process of Step S13, the support order of at least two vehicles allocated to the same group is determined. This determination of the support order is performed, for example, based on the position and traveling direction information LCT of the vehicles allocated to the same group. For example, the support order may be determined based on times at which support requests from the vehicles allocated to the same group have been received by the remote support server 3. For example, determination of the support order may be determined based on a combination of times at which support requests from the vehicles allocated to the same group have been received by the remote support server 3 and the scheduled operation information APN of the vehicles.

Subsequently to the process of Step S13, a computer in charge is determined (Step S14). This determination of the computer in charge is performed based on the determination result of Step S11. When the determination result of Step S11 is negative, one computer in charge is arbitrarily determined out of the support devices 4 on standby. When the determination result of Step S11 is positive, computers in charge of the number corresponding to the total number of groups set in the process of Step S12 are arbitrarily determined out of the support devices 4 on standby.

Subsequently to the process of Step S14, support request information IRQ and vehicle information IVH are transmitted to the computer in charge (Step S15). Information of the vehicles 2 organized into the group taken in charge of by a support device 4 is transmitted to the computer in charge. In the process of Step S15, the support request information IRQ and the vehicle information IVH of a first vehicle 2 in the support order in the group are transmitted. When only one vehicle 2 is organized into the group, the support request information IRQ and the vehicle information WH of the vehicle 2 are transmitted in the process of Step S15.

Subsequently to the process of Step S15, it is determined whether support instruction information IAS has been received from the computer in charge (Step S16). When the determination result of Step S16 is positive, the support instruction information IAS is transmitted to the supported vehicle (Step S17).

When the determination result of Step S16 is negative, it is determined whether support cancellation information CSL has been received from the vehicle 2 (Step S18). When a support request is canceled as described above, the vehicle 2 transmits support cancellation information CSL to the remote support server 3. When the determination result of Step S18 is positive, the group and the support order are corrected (Step S19). Specifically, the vehicle 2 having transmitted the support cancellation information CSL is deleted from the group, and the support order in the group is corrected.

Subsequently to the process of Step S17 or S19, it is determined whether a vehicle 2 unsupported in response to a support request remains in the same group (Step S20). When the determination result of Step S20 is negative, the mediation process in this time ends. Otherwise, the support request information IRQ and the vehicle information IVH are transmitted to the computer in charge (Step S21). Information of a subsequent vehicle 2 in the support order in the group taken in charge of by the support device 4 is transmitted to the computer in charge. That is, when support in response to the support request from a k-th (k≥1) vehicle 2 is completed, the support request information IRQ and the vehicle information IVH of the (k+1)-th vehicle 2 are transmitted to the computer in charge.

Subsequently to the process of Step S21, it is determined whether support instruction information IAS has been received from the computer in charge (Step S22). When the determination result of Step S22 is positive, the support instruction information IAS is transmitted to a supported vehicle (Step S23). Otherwise, it is determined whether support cancellation information CSL has been received from a vehicle 2 (Step S24). When the determination result of Step S24 is positive, the group and the support order are corrected (Step S25). Details of the processes of Steps S22 to S25 are the same as those of Steps S16 to S19.

4. Aspects

According to the aforementioned embodiment, the mediation process is performed. With the mediation process, when support requests from at least two vehicles 2 temporarily stopping at close positions have been issued in the same time period, the vehicles 2 are organized into one group, and the support order in the same group is determined. Accordingly, it is possible to efficiently perform support in response to such support requests. Since this results in a decrease in a burden on an operator OP who performs support in response to such support requests, it can be expected to contribute to smooth operating of a remote support service.

According to the embodiment, after organization of a group has been performed, reorganization of the group is performed according to necessity. Accordingly, since the total number of vehicles 2 organized into the group is limited to an appropriate range, it is possible to prevent occurrence of inconvenience due to organization of a group. This can be expected to contribute to smooth operating of a remote support service.

What is claimed is:

1. A system comprising:
a plurality of vehicles configured to travel autonomously; and
a remote support server comprising:
an information processing device including a memory configured to store various types of information and a processor configured to process the various types of information; and
a communication device configured to communicate with the plurality of vehicles,
wherein the processor is configured to perform a mediation process of mediating remote support of at least one vehicle out of the plurality of vehicles when a request for remote support from the at least one vehicle has been received,
wherein the various types of information include map information, position and traveling direction information of the at least one vehicle, and surrounding image information of the at least one vehicle, and
wherein the processor is configured to perform the mediation process including:
organizing at least two vehicles out of the plurality of vehicles into at least one group based on the map information and position and traveling direction information of the at least two vehicles when requests for remote support from the at least two vehicles have been received within a predetermined time period;
determining the support order of the vehicles in the at least one group for each group based on the map information and the position and traveling direction information of the at least two vehicles;
transmitting the surrounding image information of the corresponding vehicle to at least one support device that performs remote support of the vehicles organized into the at least one group in the support order; and
transmitting support instruction information generated in the support order to a vehicle which is a destination of the support instruction information when the support instruction information has been received from the at least one support device;
wherein, upon receiving the support instruction information, the vehicle which is the destination of the support instruction information travels autonomously based on the support instruction information.

2. The remote support server according to claim 1, wherein the processor is configured to perform the mediation process further including:
determining the support order sequentially from the head of the vehicles combined into the at least one group when traveling directions of all the vehicles organized into the at least one group are the same and all the vehicles are located in the same lane.

3. The remote support server according to claim 1, wherein the processor is configured to perform the mediation process further including:
determining the support order sequentially from the vehicle from which the request for remote support has been received earliest when traveling directions of all the vehicles organized into the at least one group are the same and all the vehicles are not located in the same lane.

4. The remote support server according to claim 1, wherein the various types of information further include scheduled operation information indicating information of operations which are scheduled to be performed by the at least two vehicles, and
wherein the processor is configured to perform the mediation process further including:
determining the support order based on a combination of a receiving time of the request for remote support and the scheduled operation information when traveling directions of all the vehicles organized into the at least one group are not the same.

5. The remote support server according to claim 1, wherein the various types of information further include at least one of support cancellation information for cancelling the request for remote support, lighting color information of a light emitting unit of a traffic signal which is provided in a traffic regulation spot in front of the at least one vehicle, and external recognition information of the at least one vehicle, and
wherein the processor is configured to perform the mediation process further including:
reorganizing the at least one group using at least one of the support cancellation information, the lighting color information, and the external recognition information after the at least two vehicles have been organized into the at least one group and before the surrounding image information has been transmitted to the at least one support device.

6. A remote support method of causing a server to perform remote support of a plurality of vehicles that is able to travel autonomously, the remote support method comprising:
a step of receiving a request for remote support from at least one vehicle out of the plurality of vehicles;
a step of organizing at least two vehicles out of the plurality of vehicles into at least one group based on map information and position and traveling direction information of the at least two vehicles when requests for remote support from the at least two vehicles have been received within a predetermined time period;
a step of determining the support order of the vehicles in the at least one group for each group based on the map information and the position and traveling direction information of the at least two vehicles;
a step of transmitting surrounding image information of the corresponding vehicle to at least one support device that performs remote support of the vehicles organized into the at least one group in the support order;
a step of transmitting support instruction information generated in the support order to a vehicle which is a destination of the support instruction information when the support instruction information has been received from the at least one support device; and
a step of the vehicle which is the destination of the support instruction information receiving the support instruction information and travelling autonomously based on the support instruction information.

7. A non-transitory storage medium storing a remote support program causing a server to perform remote support of a plurality of vehicles that is able to travel autonomously, the remote support program causing the server to perform:
  a process of receiving a request for remote support from at least one vehicle out of the plurality of vehicles;
  a process of organizing at least two vehicles out of the plurality of vehicles into at least one group based on map information and position and traveling direction information of the at least two vehicles when requests for remote support from the at least two vehicles have been received within a predetermined time period;
  a process of determining the support order of the vehicles in the at least one group for each group based on the map information and the position and traveling direction information of the at least two vehicles;
  a process of transmitting surrounding image information of the corresponding vehicle to at least one support device that performs remote support of the vehicles organized into the at least one group in the support order; and
  a process of transmitting support instruction information generated in the support order to a vehicle which is a destination of the support instruction information when the support instruction information has been received from the at least one support device; and
  a process of the vehicle which is the destination of the support instruction information receiving the support instruction information and travelling autonomously based on the support instruction information.

* * * * *